(12) United States Patent
Jensen et al.

(10) Patent No.: US 9,479,548 B2
(45) Date of Patent: Oct. 25, 2016

(54) COLLABORATION SYSTEM WITH WHITEBOARD ACCESS TO GLOBAL COLLABORATION DATA

(71) Applicant: HAWORTH, INC., Holland, MI (US)

(72) Inventors: Aaron Michael Jensen, Seattle, WA (US); David M Foley, Seattle, WA (US); Adam Pearson, Seattle, WA (US); Demian Entrekin, Oakland, CA (US)

(73) Assignee: HAWORTH, INC., Holland, MI (US)

( * ) Notice: Subject to any disclaimer, the term of this patent is extended or adjusted under 35 U.S.C. 154(b) by 225 days.

(21) Appl. No.: 13/759,017

(22) Filed: Feb. 4, 2013

(65) Prior Publication Data

US 2014/0223334 A1 Aug. 7, 2014

(51) Int. Cl.
*H04L 29/06* (2006.01)
*G06Q 10/10* (2012.01)
*G06Q 50/00* (2012.01)

(52) U.S. Cl.
CPC ........... *H04L 65/403* (2013.01); *G06Q 10/101* (2013.01); *G06Q 50/01* (2013.01)

(58) Field of Classification Search
CPC ...... G06Q 10/10; G06F 3/0481; H04N 7/15; H04L 65/403
USPC ........................................................ 715/753
See application file for complete search history.

(56) References Cited

U.S. PATENT DOCUMENTS

| | | |
|---|---|---|
| 4,686,332 A | 8/1987 | Greanias et al. |
| 5,008,853 A | 4/1991 | Bly et al. |
| 5,220,657 A | 6/1993 | Bly et al. |
| 5,309,555 A | 5/1994 | Akins et al. |
| 5,446,842 A | 8/1995 | Schaeffer et al. |
| 5,537,526 A | 7/1996 | Anderson et al. |
| 5,563,996 A | 10/1996 | Tchao |
| 5,727,002 A | 3/1998 | Miller et al. |
| 5,781,732 A | 7/1998 | Adams |
| 5,818,425 A | 10/1998 | Want et al. |

(Continued)

FOREIGN PATENT DOCUMENTS

| | | |
|---|---|---|
| CN | 101630240 A | 1/2010 |
| JP | 2010079834 A | 4/2010 |

(Continued)

OTHER PUBLICATIONS

PCT/US2014/014489—International Search Report and Written Opinion dated May 30, 2014, 13 pages.

(Continued)

*Primary Examiner* — William Bashore
*Assistant Examiner* — Jeanette J Parker
(74) *Attorney, Agent, or Firm* — Haynes Beffel & Wolfeld LLP

(57) ABSTRACT

A computer system has access to a database storing collaboration data for at least one collaboration having a collaboration space. The collaboration data includes data structures identifying objects displayable by a display client on a display wall and associating locations in the collaboration space with the objects. The system includes logic configured to identify available display walls, each available wall having an identification code; logic to detect user input identifying a collaboration and an identification code for one of the free display walls; and logic to enable delivery of collaboration data for the identified collaboration to a display client for the identified display wall.

13 Claims, 14 Drawing Sheets

(56) References Cited

U.S. PATENT DOCUMENTS

| | | | |
|---|---|---|---|
| 5,835,713 A | 11/1998 | FitzPatrick et al. | |
| 5,872,924 A | 2/1999 | Nakayama et al. | |
| 5,938,724 A | 8/1999 | Pommier et al. | |
| 5,940,082 A | 8/1999 | Brinegar et al. | |
| 6,084,584 A | 7/2000 | Nahi et al. | |
| 6,128,014 A | 10/2000 | Nakagawa et al. | |
| 6,167,433 A | 12/2000 | Maples et al. | |
| 6,320,597 B1 | 11/2001 | Ieperen | |
| 6,342,906 B1 | 1/2002 | Kumar et al. | |
| 6,343,313 B1 | 1/2002 | Salesky et al. | |
| 6,518,957 B1 | 2/2003 | Lehtinen et al. | |
| 6,564,246 B1 | 5/2003 | Varma et al. | |
| 6,911,987 B1 | 6/2005 | Mairs et al. | |
| 6,930,673 B2 | 8/2005 | Kaye et al. | |
| 6,930,679 B2 | 8/2005 | Wu et al. | |
| 7,003,728 B2 | 2/2006 | Berque | |
| 7,043,529 B1 | 5/2006 | Simonoff | |
| 7,129,934 B2 | 10/2006 | Luman et al. | |
| 7,171,448 B1 | 1/2007 | Danielsen et al. | |
| 7,356,563 B1 | 4/2008 | Leichtling et al. | |
| 7,450,109 B2 | 11/2008 | Halcrow et al. | |
| D600,703 S | 9/2009 | LaManna et al. | |
| 8,209,308 B2 | 6/2012 | Rueben et al. | |
| D664,562 S | 7/2012 | McCain et al. | |
| 8,402,391 B1 | 3/2013 | Doray et al. | |
| 8,898,590 B2 | 11/2014 | Okada et al. | |
| 2003/0020671 A1 | 1/2003 | Santoro et al. | |
| 2003/0058227 A1 | 3/2003 | Hara et al. | |
| 2004/0060037 A1 | 3/2004 | Damm et al. | |
| 2004/0150627 A1 | 8/2004 | Luman et al. | |
| 2004/0155871 A1 | 8/2004 | Perski et al. | |
| 2004/0174398 A1 | 9/2004 | Luke et al. | |
| 2005/0060656 A1 | 3/2005 | Martinez et al. | |
| 2005/0195216 A1 | 9/2005 | Kramer et al. | |
| 2005/0237380 A1 | 10/2005 | Kakii et al. | |
| 2005/0273700 A1 | 12/2005 | Champion et al. | |
| 2006/0012580 A1 | 1/2006 | Perski et al. | |
| 2006/0066588 A1 | 3/2006 | Lyon et al. | |
| 2006/0195507 A1 | 8/2006 | Baek et al. | |
| 2006/0211404 A1 | 9/2006 | Cromp et al. | |
| 2006/0220982 A1 | 10/2006 | Ueda | |
| 2006/0224427 A1* | 10/2006 | Salmon | 705/8 |
| 2007/0262964 A1 | 11/2007 | Zotov et al. | |
| 2008/0143818 A1 | 6/2008 | Ferren et al. | |
| 2008/0163053 A1 | 7/2008 | Hwang et al. | |
| 2008/0177771 A1 | 7/2008 | Vaughn | |
| 2008/0207188 A1 | 8/2008 | Ahn et al. | |
| 2009/0049381 A1 | 2/2009 | Robertson et al. | |
| 2009/0089682 A1 | 4/2009 | Baier et al. | |
| 2009/0128516 A1 | 5/2009 | Rimon et al. | |
| 2009/0153519 A1 | 6/2009 | Suarez Rovere | |
| 2009/0160786 A1 | 6/2009 | Finnegan | |
| 2009/0174679 A1 | 7/2009 | Westerman | |
| 2009/0195518 A1 | 8/2009 | Mattice et al. | |
| 2009/0251457 A1 | 10/2009 | Walker et al. | |
| 2009/0278806 A1 | 11/2009 | Duarte et al. | |
| 2009/0282359 A1 | 11/2009 | Saul et al. | |
| 2009/0309846 A1 | 12/2009 | Trachtenberg et al. | |
| 2009/0309853 A1 | 12/2009 | Hildebrandt et al. | |
| 2010/0017727 A1 | 1/2010 | Offer et al. | |
| 2010/0073454 A1 | 3/2010 | Lovhaugen et al. | |
| 2010/0132034 A1 | 5/2010 | Pearce et al. | |
| 2010/0205190 A1 | 8/2010 | Morris et al. | |
| 2010/0211920 A1 | 8/2010 | Westerman et al. | |
| 2010/0306650 A1 | 12/2010 | Oh et al. | |
| 2010/0306696 A1 | 12/2010 | Groth et al. | |
| 2010/0309148 A1 | 12/2010 | Fleizach et al. | |
| 2010/0315481 A1 | 12/2010 | Wijngaarden et al. | |
| 2010/0318470 A1 | 12/2010 | Meinel et al. | |
| 2010/0318921 A1 | 12/2010 | Trachtenberg et al. | |
| 2010/0328306 A1 | 12/2010 | Chau et al. | |
| 2011/0069184 A1 | 3/2011 | Go | |
| 2011/0109526 A1 | 5/2011 | Bauza et al. | |
| 2011/0148926 A1 | 6/2011 | Koo et al. | |
| 2011/0154192 A1 | 6/2011 | Yang et al. | |
| 2011/0183654 A1 | 7/2011 | Lanier et al. | |
| 2011/0197147 A1 | 8/2011 | Fai | |
| 2011/0197157 A1 | 8/2011 | Hoffman et al. | |
| 2011/0202424 A1 | 8/2011 | Chun et al. | |
| 2011/0208807 A1 | 8/2011 | Shaffer | |
| 2011/0214063 A1 | 9/2011 | Saul | |
| 2011/0216064 A1 | 9/2011 | Dahl et al. | |
| 2011/0225494 A1 | 9/2011 | Shmuylovich et al. | |
| 2011/0246875 A1 | 10/2011 | Parker et al. | |
| 2011/0264785 A1* | 10/2011 | Newman et al. | 709/223 |
| 2011/0271229 A1 | 11/2011 | Yu | |
| 2012/0011465 A1 | 1/2012 | Rezende | |
| 2012/0019452 A1 | 1/2012 | Westerman | |
| 2012/0026200 A1 | 2/2012 | Okada et al. | |
| 2012/0030193 A1* | 2/2012 | Richberg et al. | 707/719 |
| 2012/0038572 A1 | 2/2012 | Kim et al. | |
| 2012/0050197 A1 | 3/2012 | Kemmochi | |
| 2012/0075212 A1 | 3/2012 | Park et al. | |
| 2012/0124124 A1 | 5/2012 | Beaty et al. | |
| 2012/0127126 A1 | 5/2012 | Mattice et al. | |
| 2012/0176328 A1 | 7/2012 | Brown et al. | |
| 2012/0179994 A1 | 7/2012 | Knowlton et al. | |
| 2012/0229425 A1* | 9/2012 | Barrus et al. | 345/179 |
| 2012/0254858 A1* | 10/2012 | Moyers et al. | 717/177 |
| 2012/0260176 A1 | 10/2012 | Sehrer | |
| 2012/0274583 A1 | 11/2012 | Haggerty | |
| 2012/0275683 A1 | 11/2012 | Adler et al. | |
| 2012/0278738 A1 | 11/2012 | Kruse et al. | |
| 2012/0320073 A1 | 12/2012 | Mason | |
| 2013/0004069 A1* | 1/2013 | Hawkins et al. | 382/165 |
| 2013/0047093 A1 | 2/2013 | Reuschel et al. | |
| 2013/0218998 A1 | 8/2013 | Fischer et al. | |
| 2013/0320073 A1 | 12/2013 | Yokoo et al. | |
| 2013/0346878 A1 | 12/2013 | Mason | |
| 2013/0346910 A1 | 12/2013 | Mason | |
| 2014/0022334 A1 | 1/2014 | Lockhart et al. | |
| 2014/0033067 A1 | 1/2014 | Pittenger et al. | |
| 2014/0055400 A1 | 2/2014 | Reuschel | |
| 2014/0062957 A1 | 3/2014 | Perski et al. | |
| 2014/0222916 A1 | 8/2014 | Foley et al. | |
| 2014/0223335 A1 | 8/2014 | Pearson | |
| 2015/0084055 A1 | 3/2015 | Nagata et al. | |

FOREIGN PATENT DOCUMENTS

| | | |
|---|---|---|
| JP | 2012043251 A | 3/2012 |
| WO | 0161633 A2 | 8/2001 |
| WO | 2009018314 A2 | 2/2009 |
| WO | 2011/029067 A2 | 3/2011 |
| WO | 2011/048901 A1 | 4/2011 |
| WO | 2012/162411 A1 | 11/2012 |

OTHER PUBLICATIONS

PCT/US2014/014494—International Search Report and Written Opinion dated May 30, 2014, 10 pages.

PCT/US2014/018375—International Search Report and Written Opinion mailed Jul. 1, 2014, 16 pages.

Anacore, "Anacore Presents Synthesis", InfoComm 2012: Las Vegas, NV, USA, Jun. 9-15, 2012, 2 pages, screen shots taken from http://www.youtube.com/watch?v=FbQ9P1c5aHk (visited Nov. 1, 2013).

PCT/US2012/39176—International Search Report and Written Opinion mailed Sep. 24, 2012, 21 pages.

Masters Thesis: "The ANA Project, Development of the ANA-Core Software" Ariane Keller, Sep. 21, 2007, ETH Zurich, 92 pages.

U.S. Appl. No. 13/758,984, filed Feb. 4, 2013, entitled "Region Dynamics for Digital Whiteboard," Inventor Steve Mason, 28 pages.

U.S. Appl. No. 13/758,989, filed Feb. 4, 2013, entitled "Toolbar Dynamics for Digital Whiteboard," Inventor Steve Mason, 26 pages.

U.S. Appl. No. 13/758,993, filed Feb. 4, 2013, entitled "Line Drawing Behavior for Digital Whiteboard," Inventor Steve Mason, 29 pages.-

(56) References Cited

OTHER PUBLICATIONS

U.S. Appl. No. 13/759,018, filed Feb. 4, 2013, entitled "Collaboration System with Whiteboard with Federated Display," Inventor Adam Pearson, 48 pages.
EP12789695.9—Supplemental European Search Report dated Nov. 19, 2014, 9 pages.
PCT/US2013/058030—International Search Report and Written Opinion mailed Dec. 27, 2013, 11 pgs.
PCT/US2013/058040—International Search Report and Written Opinion mailed Dec. 18, 2013, 10 pgs.
PCT/US2013/058249—International Search Report and Written Opinion mailed Dec. 18, 2013, 14 pgs.
PCT/US2013/058261—International Search Report and Written Opinion mailed Dec. 30, 2013, 14 pgs.
U.S. Appl. No. 13/758,984—Office Action dated Oct. 8, 2014, 21 pgs.
U.S. Appl. No. 13/758,989—Office Action dated Oct. 7, 2014, 8 pgs.
PCT/US2014/014475—International Search Report and Written Opinion dated Nov. 28, 2014, 10 pgs.
U.S. Appl. No. 13/758,993—Office Action dated Feb. 3, 2015, 22 pgs.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2014.
U.S. Appl. No. 14/018,370—Office Action dated May 21, 2015, 51 pages.
U.S. Appl. No. 13/478,994—Office Action dated Jul. 8, 2015, 12 pgs.
U.S. Appl. No. 13/478,994—Office Action dated Sep. 29, 2014, 10 pgs.
U.S. Appl. No. 13/478,994—Office Action dated Dec. 9, 2013, 7 pgs.
Albin, T., "Comfortable Portable Computing: The Ergonomic Equation," Copyright 2008 Ergotron, Inc., 19 pgs.
"Ergonomics Data and Mounting Heights," Ergonomic Ground Rules, last revised Sep. 22, 2010, 2 pgs.
U.S. Appl. No. 13/758,984—Office Action dated Jun. 19, 2015, 25 pgs.
U.S. Appl. No. 13/758,989—Office Action dated Jun. 19, 2015, 9 pgs.
U.S. Appl. No. 13/758,989—Office Action dated Feb. 12, 2015, 9 pgs.
U.S. Appl. No. 13/758,993—Office Action dated Jul. 30, 2015, 43 pgs.
U.S. Appl. No. 13/759,018—Office Action dated Oct. 22, 2014, 16 pgs.
U.S. Appl. No. 13/759,018—Office Action dated Apr. 23, 2015, 24 pgs.
U.S. Appl. No. 13/759,018—Office Action dated Aug. 27, 2015, 22 pgs.
U.S. Appl. No. 13/758,984—Office Action dated Feb. 13, 2015, 22 pgs.

\* cited by examiner

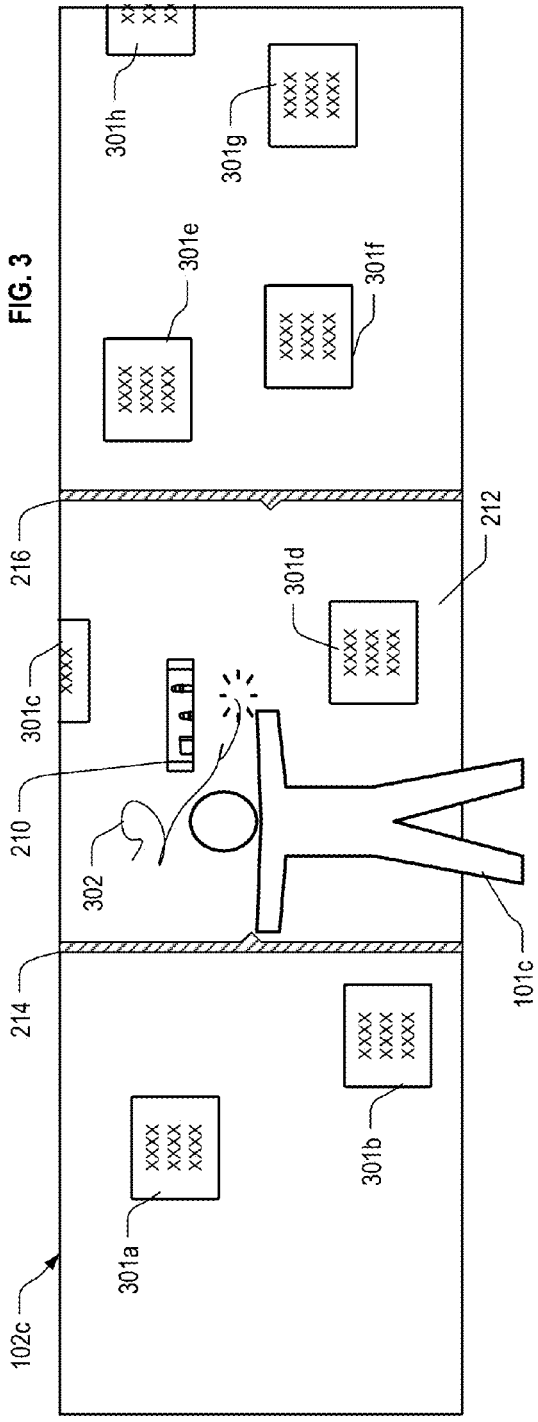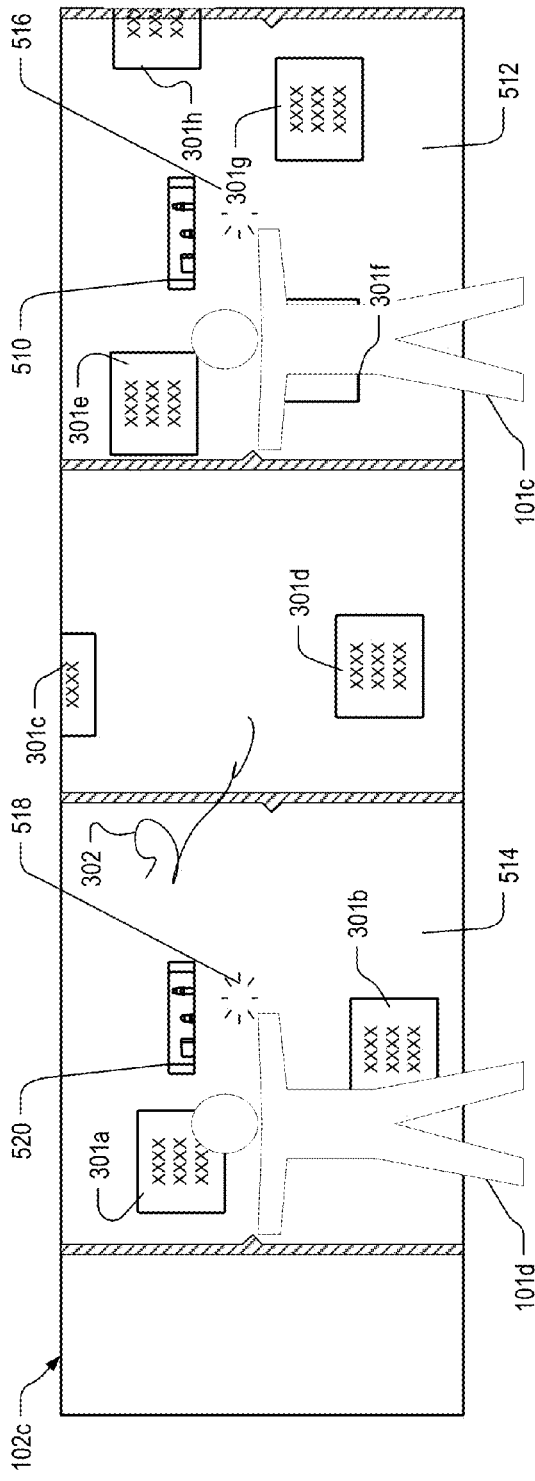

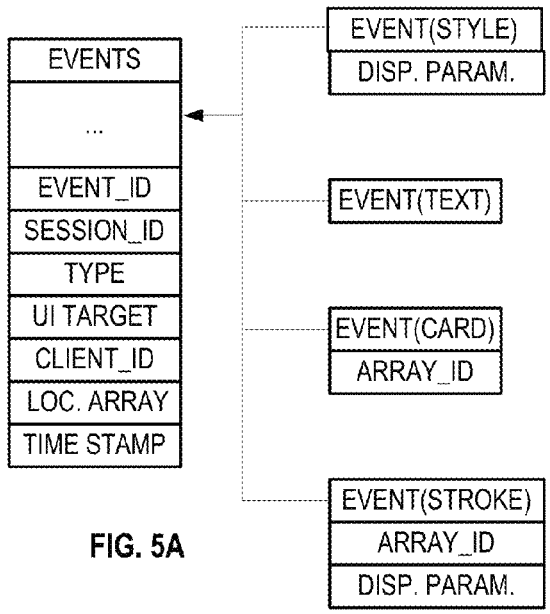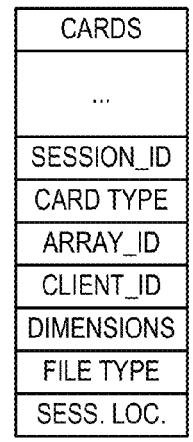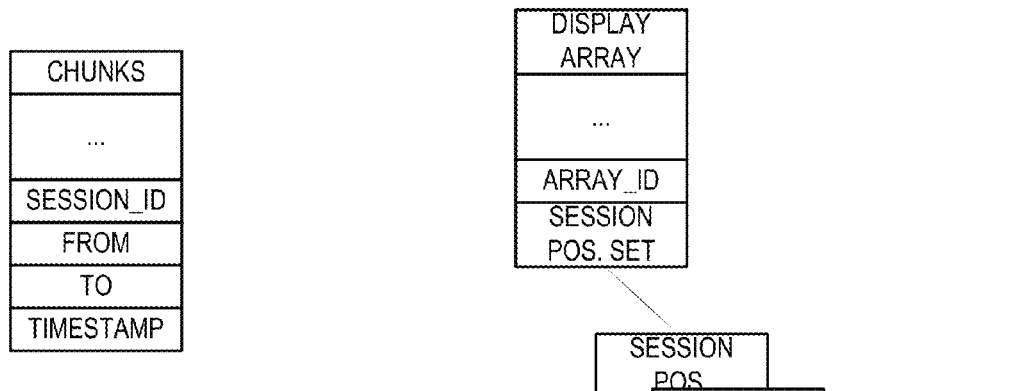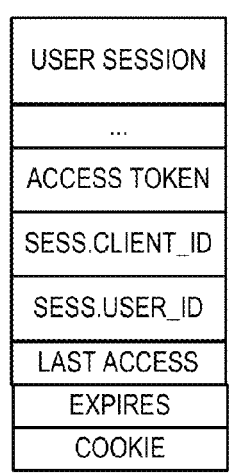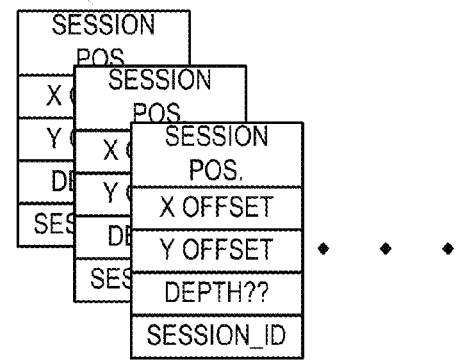
FIG. 5A
FIG. 5B
FIG. 5C
FIG. 5D
FIG. 5E

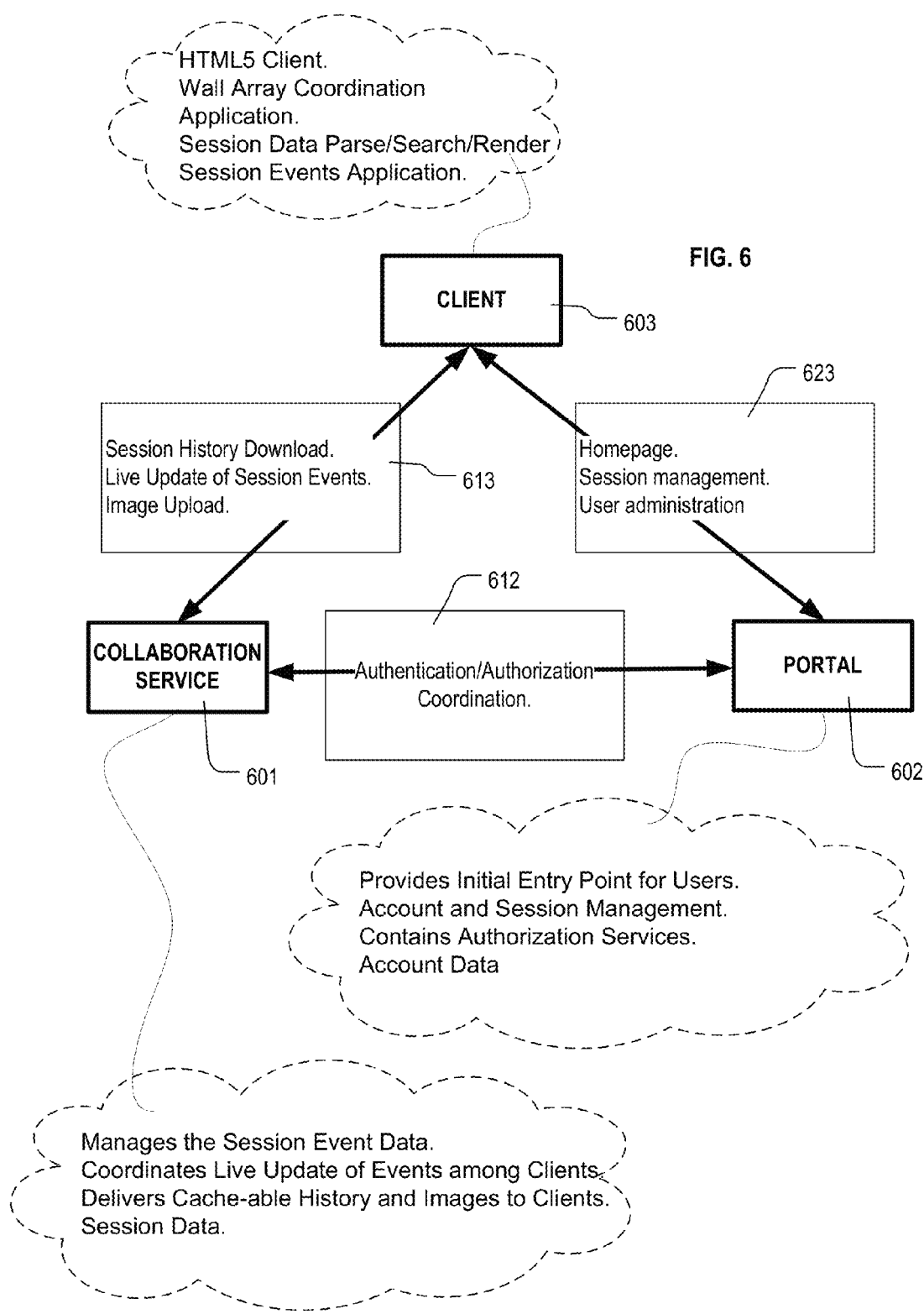

COLLABORATION SYSTEM WITH WHITEBOARD ACCESS TO GLOBAL COLLABORATION DATA

CROSS-REFERENCE TO OTHER APPLICATIONS

The following applications are incorporated by reference:
U.S. application Ser. No. 13/478,994 filed 23 May 2012 (now U.S. Pat. No. 9,430,140);
PCT International Application No. PCT/US2012/39176, filed 23 May 2012;
PCT International Application No. PCT/US2010/047913 filed 3 Sep. 2010;
U.S. application Ser. No. 13/758,984 filed on 4 Feb. 2013 (now U.S. Patent Publication No. 2013/0346910), entitled REGION DYNAMICS FOR DIGITAL WHITEBOARD;
U.S. application Ser. No. 13/758,989 filed on 4 Feb. 2013 (now U.S. Patent Publication No. 2013/0346878), entitled TOOLBAR DYNAMICS FOR DIGITAL WHITEBOARD;
U.S. application Ser. No. 13/758,993 filed on 4 Feb. 2013, entitled LINE DRAWING BEHAVIOR FOR DIGITAL WHITEBOARD; and
U.S. application Ser. No. 13/759,018 filed on 4 Feb. 2013 (now U.S. Patent Publication No. 2014/0223335), entitled COLLABORATION SYSTEM WITH WHITEBOARD WITH FEDERATED DISPLAY.

///

STATEMENT CONCERNING JOINT RESEARCH AGREEMENT

Haworth, Inc., a Michigan corporation, Thought Stream LLC, a Delaware corporation, and Obscura Digital Incorporated, a California corporation, are parties to a Joint Research Agreement.

///

BACKGROUND

The invention relates to apparatuses, methods, and systems for digital collaboration, and more particularly to digital whiteboard systems which facilitate multiple simultaneous users having access to global collaboration data.

Digital whiteboards are often used for interactive presentations and other purposes. Some whiteboards are networked and can be used for collaboration, so that modifications made to the display image on one whiteboard are replicated on another whiteboard or display. Large scale whiteboards offer the opportunity for more than one user to present or annotate simultaneously on the same surface. However, problems can occur in the coordination of the multiple users, and in some circumstances their use of a single whiteboard can restrict their flexibility of expression.

Also, digital whiteboards can comprise large display screens or arrays of screens in a single room, which are configured to provide a large "whiteboard" like interaction surface. Thus, it is anticipated that the large digital whiteboards may be shared by many users at different times for different collaborations. Where the collaboration data for collaboration is confidential with access limited to authorized users, but the digital whiteboards at which the users interact are distributed to many sites and not necessarily under exclusive control of a single user, a problem arises with the security of access to a collaboration.

In addition, the distributed nature of the system leads to the possibility of multiple users in different places who interact with, and can change, the same collaboration data at the same time, and at times when no other user is observing the collaboration data. This creates a problem with concurrency in the multiple locations, and with sharing information about a current state of the collaboration data.

Therefore, it would be desirable to find ways to allow multiple users to share collaboration data in a distributed network of whiteboards, in such a way that each user has maximum freedom to express his or her ideas with real time exchange of ideas, while providing security adequate to protect the confidential nature of the collaboration. An opportunity therefore arises to create robust solutions to the problem. Better ideas, collaboration and results may be achieved.

SUMMARY

A collaboration system is described that can have many, distributed digital whiteboards which are used both to display images based on collaboration data managed by a shared collaboration server, and to accept user input that can contribute to the collaboration data. The system can include management logic providing collaboration data to selected whiteboards based a protocol that insures that an user authorized for the collaboration data has physical access the selected whiteboard. Also, a collaboration system can have many, distributed digital whiteboards which are used both to display images based on collaboration data managed by a shared collaboration server, and to accept user input that can contribute to the collaboration data, while enabling each whiteboard to rapidly construct an image to display based on session history, real time local input and real-time input from other whiteboards. Yet another aspect of the technology described herein involves a whiteboard architecture based on federated displays arranged in an array, which cooperate to act as one whiteboard used both to display images based on collaboration data managed by a remote collaboration server, and to accept user input that can contribute to the collaboration data.

The above summary is provided in order to provide a basic understanding of some aspects of the collaboration system described herein. This summary is not intended to identify key or critical elements of invention or to delineate a scope of invention.

BRIEF DESCRIPTION OF THE DRAWINGS

The invention will be described with respect to specific embodiments thereof, and reference will be made to the drawings, which are not drawn to scale, and in which:

FIGS. 3 and 4 illustrate aspects of drawing region behavior on the whiteboard of FIG. 1.

FIGS. 5A-5E (collectively FIG. 5) is a simplified diagram of data structures for parts of the collaboration data for a collaboration.

FIG. 6 illustrates functional features of actors in a collaboration in a one example of a system as described herein.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1A:
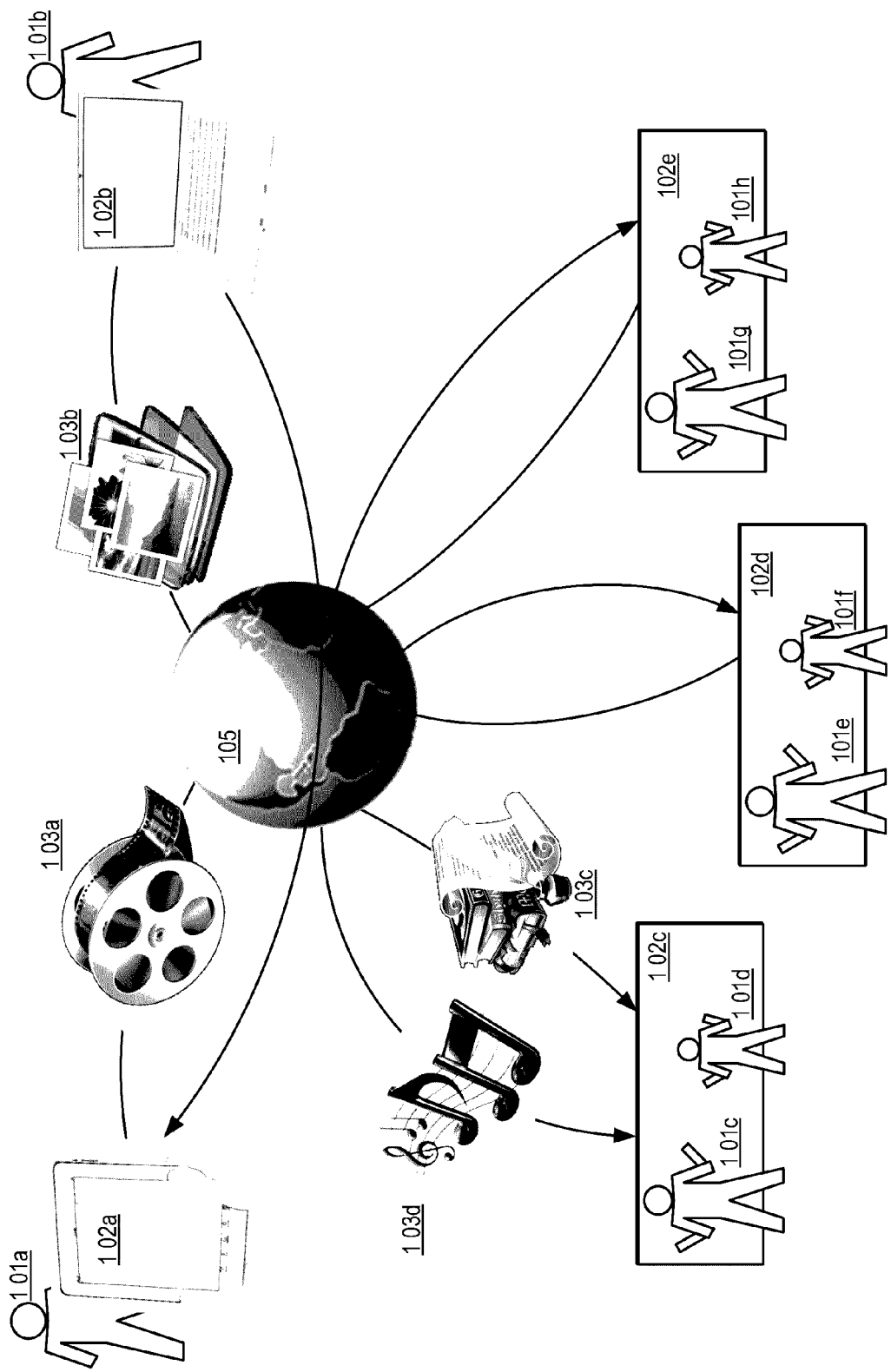
FIGS. 1A and 1B (collectively FIG. 1) illustrate example aspects of a digital whiteboard collaboration environment.

FIG. 1A illustrates example aspects of a digital whiteboard collaboration environment. In the example, a plurality of users 101a-h (collectively 101), may desire to collaborate with each other in the creation of complex images, music, video, documents, and/or other media, all generally designated in FIG. 1A as 103a-d (collectively 103). The users in the illustrated example use a variety of devices in order to collaborate with each other, for example a tablet 102a, a personal computer (PC) 102b, and many a large format whiteboards 102c, 102d, 102e (collectively devices 102). In the illustrated example the large format whiteboard 102c, which is sometimes referred to herein as a "wall", accommodates more than one of the users, (e.g. users 101c and 101d, users 101e and 101f, and users 101g and 101h).

Figure 1B:
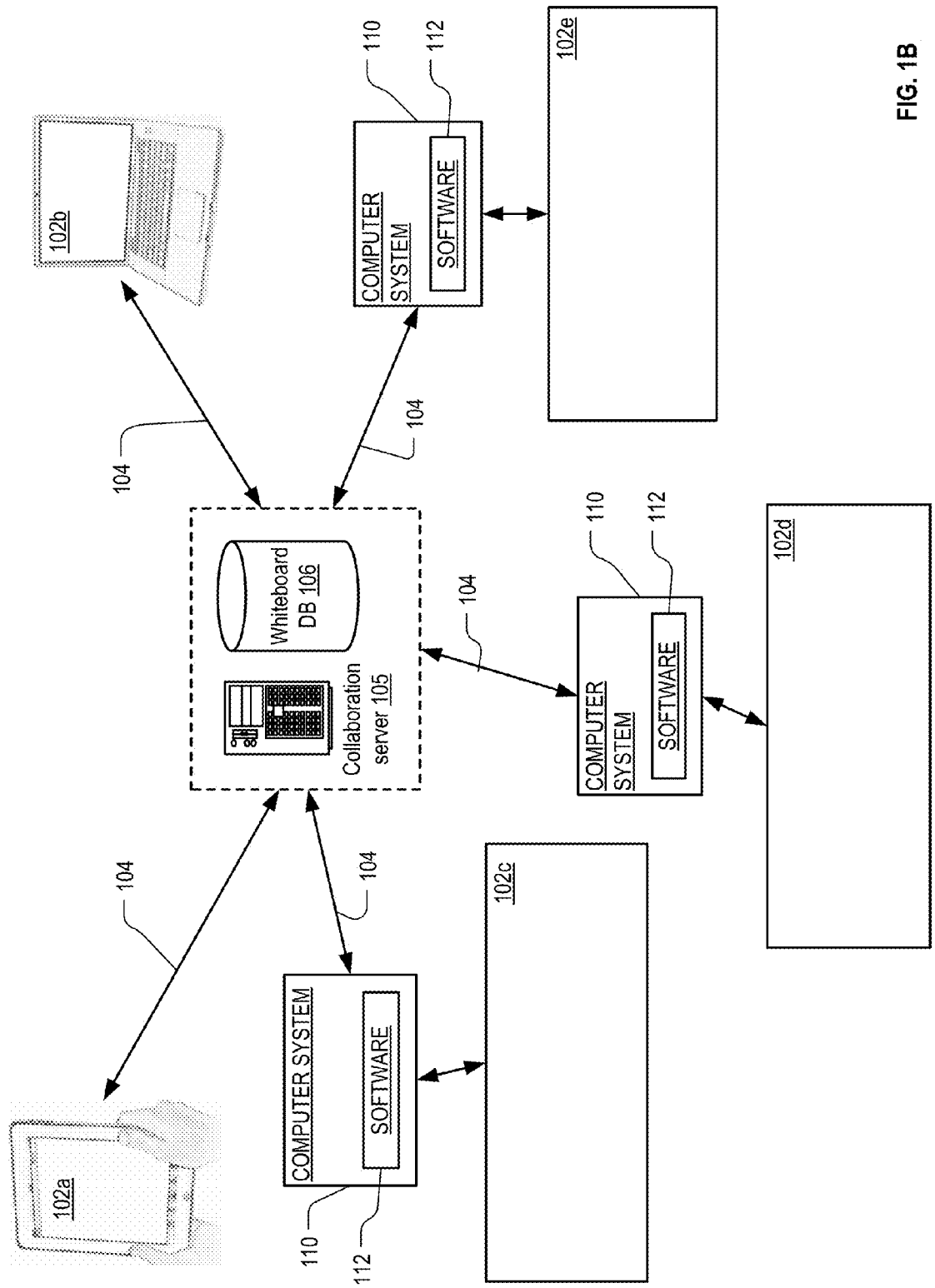

FIG. 1B illustrates the same environment as FIG. 1A. As shown in FIG. 1B, the large format displays 102c, 102d, 102e sometimes referred to herein as "walls", are controlled by a respective computer systems 110, which in turn is in network communication with a central collaboration server 105, which has accessible thereto a database 106. As used herein, the term "database" does not necessarily imply any unity of structure. For example, two or more separate databases, when considered together, still constitute a "database" as that term is used herein.

The application running at the collaboration server 105 can be hosted using Web server software such as Apache or nginx. It can be hosted for example on virtual machines running operating systems such as LINUX. The server 105 is heuristically illustrated in FIG. 1B as a single computer. However, the server architecture can involve systems of many computers, each running server applications, as is typical for large-scale cloud-based services. The server architecture includes a communication module which can be configured for various types of communication channels, including more than one channel for each client in a collaboration session. For example, near-real-time updates across the network, client software can communicate with the server communication module via using a message-based channel, based for example on the Web Socket protocol. For file uploads as well as receiving initial large volume collaboration data, the client software can communicate with the server communication module via HTTP. The server can run a front-end program written for example in JavaScript served by Ruby-on-Rails, support authentication/authorization based for example on Oauth, and support coordination among multiple distributed clients. The server communication module can include a message based communication protocol stack, such as a Web Socket application, that performs the functions of recording user actions in collaboration data, and relaying user actions to other clients as applicable. This system can run on the node.JS platform for example, or on other server technologies designed to handle high-load socket applications.

The database 106 stores, for example, a digital representation of collaboration data sets for each collaboration, where the collaboration data set can include or identify objects displayable on a whiteboard canvas and events related to such objects. There can be collaboration data sets for many different collaborations. A data set for a given collaboration can be configured in a database, or as machine readable document linked to the collaboration. The canvas can also be mapped to a region in a collaboration space which can have unlimited or virtually unlimited dimensions. The collaboration data includes data structures identifying objects displayable by a display client in the display area on a display wall, and associates a location in the collaboration space with the objects identified by the data structures. Each device 102 displays only a portion of the overall collaboration space. A display wall has a display area for displaying objects, the display area being mapped to corresponding area in the collaboration space that corresponds to a region in the collaboration space centered on, or otherwise located with, a user location in the collaboration space. The mapping of the display area to a corresponding area in the collaboration space is usable by the display client to identify objects in the collaboration data within the display area to be rendered on the display, and to identify objects to which to link user touch inputs at positions in the display area on the display.

As explained in more details below, the server 105 stores collaboration data sets for a plurality of collaborations, and provides the collaboration data to the display clients participating in the session. The collaboration data is then used by the computer systems 110 with appropriate software 112 including display client software, to determine images to display on the whiteboard, and to assign objects for interaction to locations on the display surface. In some alternatives, the server 105 can keep track of a "viewport" for each device 102, indicating the portion of the canvas viewable on that device, and can provide to each device 102 data needed to render the viewport. The application software that runs on the client device and is responsible for rendering drawing objects, handling user inputs, and communicating with the server can be HTML5-based and run in a browser environment. This allows for easy support of many different client operating system environments.

The user interface data stored in database 106 includes various types of objects, such as image bitmaps, video objects, multi-page documents, scalable vector graphics, and the like. The devices 102 are each in communication with the collaboration server 105 via a network 104. The network 104 can include all forms of networking components, such as LANs, WANs, routers, switches, WiFi components, cellular components, wired and optical components, and the internet. In one scenario two or more of the users 101 are located in the same room, and their devices 102 communicate via WiFi with the collaboration server 105. In another scenario two or more of the users 101 are separated from each other by thousands of miles and their devices 102 communicate with the collaboration server 105 via the internet. The walls 102*c*, 102*d*, 102*e* can be multi-touch devices which not only display images, but also can sense user gestures provided by touching the display surfaces with either a stylus or a part of the body such as one or more fingers. In some embodiments, a wall (e.g. 102*c*) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102*c* may, for example, be an array of Model No. MT553UTBL MultiTaction Cells, manufactured by Multi-Touch Ltd, Helsinki, Finland, tiled both vertically and horizontally. In order to provide a variety of expressive means, the wall 102*c* is operated in such a way that it maintains "state". That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, the array totals on the order of 6' in height and 30' in width, which is wide enough for multiple users to stand at different parts of the wall and manipulate it simultaneously. Flexibility of expression on the wall may be restricted in a multi-user scenario, however, since the wall does not in this embodiment distinguish between fingers of different users, or styli operated by different users. Thus if one user places the wall into one desired state, then a second user would be restricted to use that same state because the wall does not have a way to recognize that the second user's input is to be treated differently.

In order to avoid this restriction, the system defines "drawing regions" on the wall 102*c*. A drawing region, as used herein, is a region within which at least one aspect of the wall's state can be changed independently of other regions on the wall. In the present embodiment, the aspects of state that can differ among drawing regions are the properties of a line drawn on the wall using a stylus. The response of the system to finger touch behaviors is not affected by drawing regions.

Figure 2:
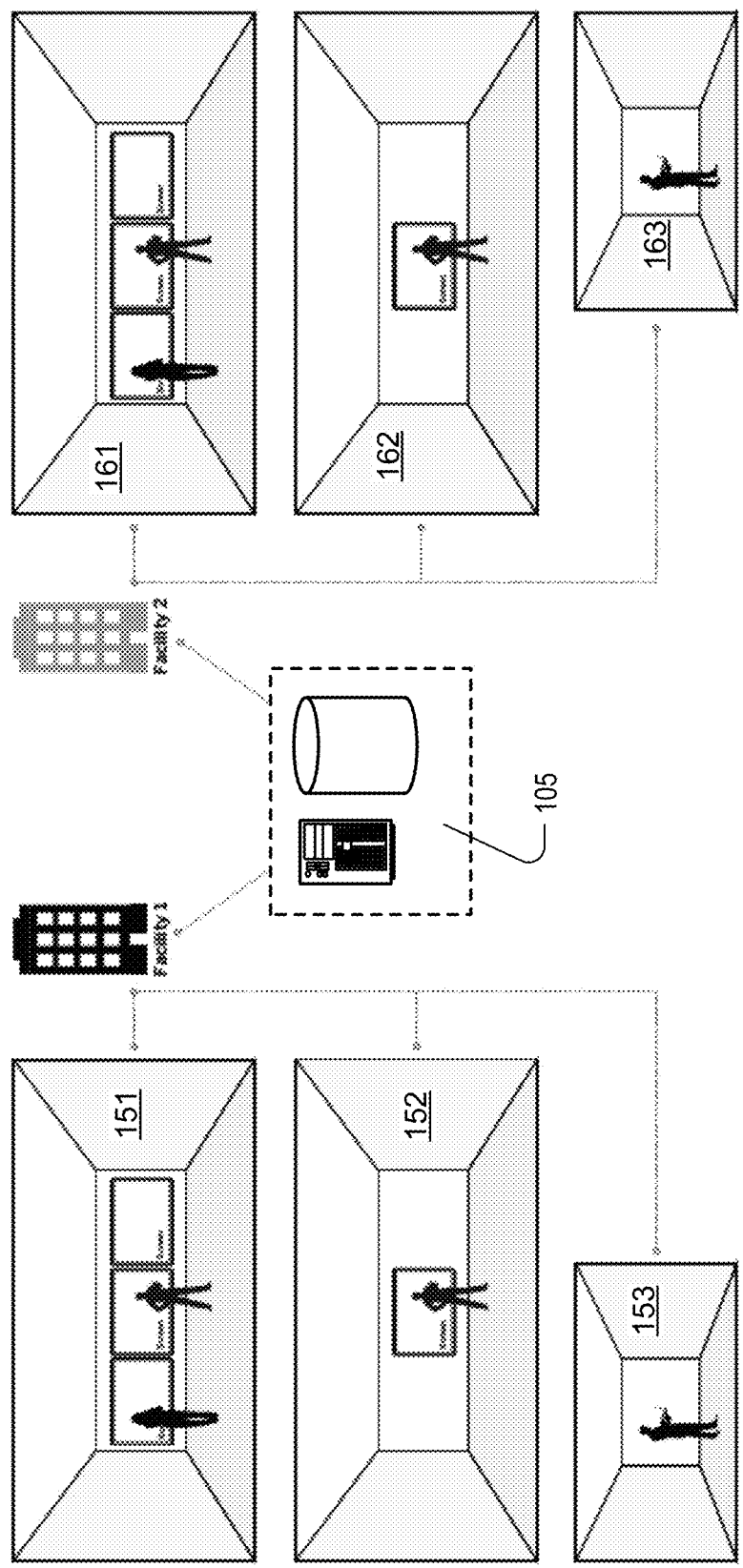
FIG. 2 illustrates a collaboration system including a plurality of display walls geographically distributed to which collaboration data can be delivered for use by authorized users.

FIG. 2 illustrates a distributed collaboration system, which includes a shared server 105 which can be linked to a number of facilities (e.g. facility 1 and facility 2) which are geographically distributed, and at which display clients are located. For example Facility 1 to be located in New York City, while Facility 2 may be located in Los Angeles. There may be many other physical locations at which display clients usable in a collaboration system are located. In this example, Facility 1 includes a first room 151, a second room 152 and a third room 153. Facility 2 includes a first room 161, a second room 162, and a third room 163. The first room 151 in Facility 1 includes a large-format whiteboard that is implemented using a plurality of displays. The second room 152 in Facility 1 includes a single screen, intermediate format whiteboard. The third room 153 in Facility 1 may be a private office or other room in which the personal computer or laptop can be utilized as the display client for a session interacting in a chosen collaboration. Facility 2 in this illustration is like facility 1, and includes a first room 161, a second room 162 and a third room 163. The first room 161 in Facility 2 includes a large-format whiteboard that is implemented using a plurality of displays. The second room 162 in Facility 2 includes a single screen, intermediate format whiteboard. The third room 163 in Facility 2 may be a private office or other room in which the personal computer, laptop, mobile pad, or mobile phone can be utilized as the display client for a session. FIG. 2 illustrates a problem that arises in connection with distributed collaboration systems which rely on large-format or intermediate format whiteboard's (or walls) that are located remotely. The large-format and intermediate format whiteboard's are not typically under exclusive control of an individual user. The collaboration server 105 therefore may have no information about the people having access to the whiteboards at any given time.

FIG. 3 illustrates a wall 102*c*. The wall in this example is 6' tall and 30' wide. It is initially a default background color or image, and has a default drawing state throughout the wall. Also, collaboration data can define a plurality of objects 301*a* to 301*h*, collectively objects 301, having locations in the collaboration space that are mapped to physical locations in the display area of the wall. The objects 301 can comprise cards that include text, images or drawing for example, which are rendered in the display area. Also, the objects 301 can include features allowing a user to interact with the content of the card, or functions that are linked to the card using user interface tools at the display, such as the touch screen. Also as illustrated in FIG. 3, a drawing overlay object 302 can be displayed in the display area of the wall.

The drawing state can be a feature of a region independent of objects 301, 302 displayed in the region, and is defined by the line drawing properties, which in the embodiment of FIG. 3 include line appearance properties such as brush type, brush size and color. For the purposes of example, the system can be configured so that when a user 101*c* touches the wall, using either a stylus or one or more fingers (sometimes referred to collectively herein as a writing implement), a toolbar 210 appears nearby and a drawing region 212 is defined. Touching a touch point is one embodiment of what is sometimes referred to herein as "opening user input"; other embodiments will be apparent to the reader. The initial drawing state of a newly defined drawing region is a predefined default (such as brush type=ink, thickness=5 mm, color=white), which in various embodiments may or may not match the default state of the remainder of the wall. In the embodiment of FIG. 2 the drawing properties established for a drawing region apply throughout the drawing region. Line drawing operates on the wall logically in a layer above any application program that might be running on the computer system 110, regardless of whether the program has ownership of any particular area of the wall 102*c*.

In the embodiment of FIG. 3 drawing regions always fill the entire vertical extent of the wall, though in other embodiments regions can be shorter, and/or have non-rectangular shapes. Also in the embodiment of FIG. 3 drawing regions are perceptibly demarcated with left and right hand borders 214 and 216; in another embodiment other means may be used to demarcate the region, such as background shading. In yet another embodiment the region boundaries are not perceptible to the user. Assuming sufficient space to the left and right, the client side computer system 110 can spawn the drawing region in a position that is centered about the user's touch point. Drawing regions have a minimum width Wmin and an ideal width Wideal. The minimum width preferably is chosen to be the smallest width to allow reasonably unfettered expression, and in the embodiment of FIG. 3 is 4'. The ideal width preferably is chosen to be roughly equal to the widest span of an average user's arms stretched out horizontally, and in the embodiment of FIG. 3 is 6'.

If there is plenty of space on either side of the user's touch point, then the computer system 110 can set the initial region width to Wideal. This is the scenario illustrated in FIG. 3. If the user's touch point is too close to a wall edge for a new drawing region to be centered about it, then the computer system 110 will abut the new drawing region against the wall edge. The new drawing region will still have a width Wideal assuming sufficient space is available, so the new drawing region will not be centered about the user's touch point. On the other hand, if the user's touch point is far enough from the wall edge to create a drawing region centered about the touch point, but the new drawing region would be less than Wmin from the wall edge, then the gap space between the wall edge and the new drawing region is considered unusable. In this case the computer system 110 will extend the new drawing region to fill up the unusable space.

FIG. 4 illustrates a scenario, for the purposes of example, in which two users 101c and 101d can use the wall simultaneously. Initially, user 101c touches the wall 102c at touch point 516, and in response thereto the computer system 110 spawns drawing region 512 with toolbar 510. Optionally, user 101c then touches controls on toolbar 510 in order to change the line appearance properties within region 512. Next, a second user 101d touches the wall 102c at touch point 518, which is within the wall 102c background (i.e. outside of all pre-existing drawing regions). A second drawing region 514 is then spawned by the computer system 110, with toolbar 520. If user 101d draws a line at this time within region 514, the computer system 110 will paint it with the default line properties rather than those previously set by user 101c for drawing region 512. User 101d then optionally touches controls on toolbar 520 in order to change the line appearance properties within region 514. Subsequent lines drawn in region 514 will then adopt the new line appearance properties. The line appearance properties of region 512 will remain unchanged.

Drawing regions can also be made automatically track the movement of the stylus. Although numerous possible tracking algorithms will be apparent to the reader, one that follows these minimum rules is preferred: (1) the region does not move so long as the stylus remains relatively near the center of the region; and (2) as the stylus approaches a region boundary, the region moves so that the boundary remains ahead of the stylus.

Drawing regions provide one example of user interaction that can have an effect at a local display wall, but not have an effect on the global collaboration data. As illustrated in this example, the locations of the objects 301, 302 are not affected by the assignment of drawing regions, the toolbars, and the drawing overlays within the regions. Of course in other types of user interface interactions, the locations of the objects 301, 302 can be moved, and such movements can be events related to objects in the global collaboration data.

A variety of behaviors related to the interpretation of user input based on interaction with a local wall are described in co-pending U.S. application Ser. No. 13/758,984, filed on 4 Feb. 2013, entitled REGION DYNAMICS FOR DIGITAL WHITEBOARD, which is incorporated by reference above. These behaviors are illustrative of local processing of user input and image data at a wall that can be executed by the local computer systems 110, with little or no effect on the shared collaboration data maintained at the collaboration server in some embodiments.

FIGS. 5A-5E represent data structures which can be part of collaboration data maintained by a database at the collaboration server 105. In FIG. 5A, an event data structure is illustrated. An event is an interaction with the collaboration data that can result in a change in collaboration data. Thus an event can include an event identifier, a session identifier, an event type parameter, the client identifier, an array of locations in the collaboration space, which can include one or more for the corresponding event and a timestamp. It is desirable for example that the timestamp have resolution on the order of milliseconds or even finer resolution, in order to minimize the possibility of race conditions for competing events affecting a single object. Also, the event data structure can include a UI target, which identifies an object in the collaboration data to which a stroke on a touchscreen at a client display is linked. Events can include style events, which indicate the display parameters of a stroke for example. The events can include a text type event, which indicates entry, modification or movement in the collaboration space of a text object. The events can include a card type event, which indicates the creation, modification or movement in the collaboration space of a card type object. The events can include a stroke type event which identifies a location array for the stroke, and display parameters for the stroke, such as colors and line widths for example.

FIG. 5B illustrates a card data structure. The card data structure can provide a cache of attributes that identify current state information for an object in the collaboration data, including a session identifier, a card type identifier, an array identifier, the client identifier, dimensions of the cards, type of file associated with the card, and a session location within the collaboration space.

FIG. 5C illustrates a data structure which consolidates a number of events and objects into a catchable set called a chunk. The data structure includes a session ID, and identifier of the events included in the chunk, and a timestamp at which the chunk was created.

FIG. 5D illustrates the data structure for links to a user participating in a session in a chosen collaboration. This data structure can include an access token, the client identifier for the session display client, the user identifier linked to the display client, a parameter indicating the last time that a user access to a session, and expiration time and a cookie for carrying various information about the session. This information can for example maintain a current location within the collaboration space for a user, which can be used each time that a user logs in to determine the collaboration data to display at a display client to which the login is associated.

FIG. 5E illustrates a display array data structure which can be used in association with large-format whiteboards that are implemented by federated displays, each of which having a display client. The display clients in such federated displays cooperate to act as a single whiteboard. The collaboration data can maintain the display array data structure which identifies the array of displays by an array ID, and identifies the session position of each display. Each session position can include an x-offset and a y-offset within the area of the federated displays, a session identifier, and a depth.

FIG. 6 is a diagram representing a functional architecture for a distributed collaboration system used to create, modify, distribute and display collaboration data for a collaboration. The basic configuration includes a collaboration service 601 which manages event data executed by a server, such as server 105, a portal service 602 which can be executed by a server such as server 105 or located in other computer systems accessible to the server and to the client, and a display client 603 located at a wall at which the user interaction is active. The display client 603 is in communication with the collaboration service 601 and with the portal 602. The communication channel 613 between the display client 603 and a collaboration service 601 manages the download of session history, and the live update of session events. Also, across this channel 613, a display client 603 can upload images to the collaboration service 601. The display client 603 is in communication with the portal 602 across communication channel 623. The portal 602 to manages a homepage for the collaboration data, session management and user administration. This portal can be utilized for user login, authentications, and for delivering image files and the like as an alternative to, and in parallel with, the communication channel 613. The collaboration service 601 and portal 602 are in communication across channel 612. The collaboration service 601 and portal 602 manage authentication and authorization protocols, and coordinate session administration, and collaboration data management.

The display client 603 can include a physical or virtual computer system having computer programs stored in accessible memory that provide logic supporting the collaboration session, including an HTML 5 client, wall array coordination logic, collaboration data parsing searching and rendering logic, and a session events application to manage live interaction with collaboration data and the display wall.

The portal 602 can include a physical or virtual computer system having computer programs stored in accessible memory, that provide logic supporting user access to the collaboration server. The logic can include applications to provide initial entry points for users, such as a webpage with login resources, logic to manage user accounts and session anticipation, logic that provides authorization services, such as OAuth-based services, and account data.

The collaboration service 601 can manage the session event data, coordinate updated events among clients, deliver catchable history and images to clients, and control access to a database stored in the collaboration data.

Figure 7:
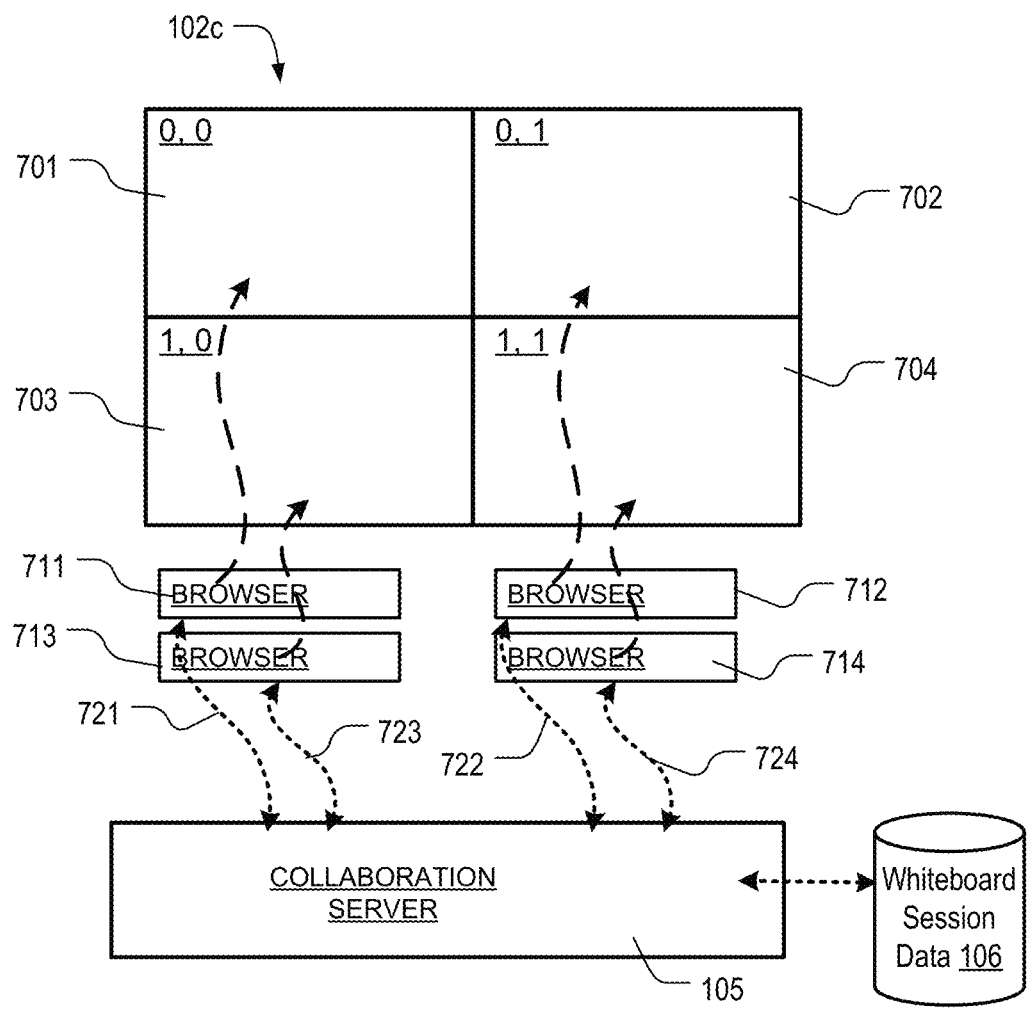
FIG. 7 is a diagram of a digital whiteboard implemented using federated displays.

FIG. 7 illustrates a whiteboard implemented by a plurality of displays 701-704 with federated control. In this example, each display 701-704 is associated with a corresponding display client 711-714. Each display client can execute a browser used to render objects from the collaboration space on the whiteboard display area, which has a plurality of subsets of display area which correspond to each the plurality of displays. Each display client can be configured to manage display in a subset of the whiteboard display area for the session, for example by storing an offset parameter (e.g. 0, 0 for display 701; 0, 1 for display 702; 1, 0 for display 703; and 1, 1 for display 704).

Each of the display client 711-714 can maintain a communication channel 721-724 with the collaboration server 105, which is in turn is coupled to the white board collaboration database 106. The collaboration server 105 can maintain a user location within the collaboration space for each authorized user. When an authorized user is logged in, and has selected a display array such as that shown in FIG. 7 as the whiteboard canvas, the collaboration server can link each of the display client 711-714 into a group associated with the session and user. The collaboration server can then download a current user location within the collaboration space to each of the display clients in the group. The display clients in the group can independently apply their offset parameter to identify session locations to map onto the subset of the display area indicated by the offset parameter. In alternative, the collaboration server can manage the offset computation in communication with each of the display clients 711-714, by delivering to each client the current user location as offset according to the array characteristics.

In order to support coordination of a single whiteboard among a plurality of displays, each of the display clients 711-714 can also communicate with each of the other display clients coming connection with events that are local to the management of the whiteboard display area, and which do not have an effect on the global collaboration data. Alternatively, the display client 711-714 can communicate solely with the collaboration server 105, which can then direct local events back to the group of display clients associated with the session, and global events to all of the display clients in active sessions with the collaboration, and to the database storing collaboration data.

The display clients at a single whiteboard comprised of federated displays can be implemented individual computer systems coupled to the corresponding displays, or can be implemented using a single computer system with virtual machines coupled to the corresponding displays.

In an embodiment of the collaboration system, an application program interface API is executed by the collaboration server 105 and display clients based on two communication channels for each display client, as suggested with reference to FIG. 6. In a federated display whiteboard, each of the display clients 711-714 can independently maintain two channels with the server. The first channel is a message based system configured for communications about live events. In one example, this first channel is implemented using a set of socket requests over a Websocket channel with the collaboration service 601, and used by the server for updating clients with relevant data (new strokes, cards, clients, etc.) once connected. The message based channel can also handle the initial connection handshake. A second channel is a more stateless type link with the portal 602, such as n HTTP/REST interface, which can be used for cacheable responses, as well as posting data (i.e. images and cards). Also an initial loading of collaboration data to a display client can be done using HTTP requests rather than the message based channel (Websockets) to support caching.

Socket Requests in one example can be executed on a channel that maintains connections via Websockets with the collaboration service 601. Messages exchanged can be individual UTF-8 encoded JSON arrays. A display client can establish a socket connection with the server, carrying session identifier, or in a manner otherwise linked to a session. A message structure and some of the message types included in an example system can be understood from the following description.

Message Structure
  The first element of each array a sender-id, specifying the client that originated the message. Sender-ids are unique among all sessions on the server.
  The id and cr messages sent from the server to the client have their sender-id set to −1. The second element of each array is a two-character code. This code defines the remaining arguments in the array as well as the intended action. An exception to this structure is the initial message the server expects to see from a client.

Valid Message Types

The following are messages supported by this example Network Protocol. Many of these messages take the following parameter:
sender-id
the ID of the client sending the message, or −1 if the message originates with the server.

Client ID Request:

```
// server < - - client
["id", sessionId, zoomLevel, x1, y1, x2, y2]
```

This request is required in order to interact with the socket API.

This request starts the asynchronous client-id request/response handshake. The next section explains the asynchronous acknowledgment of the new client (including the provided client ID).
sessionId (string) the id of the session to join.
zoomLevel (int) the zoom level desired by this client
x1, y1 (int, optional) the desired point of origin for the users viewport
x2, y2 (int, optional) the desired point of extent for the users viewport
There is no sender-id sent wall this message.
The zoom level sent in this message is the zoom level preferred by this client. If the client joins an empty display array (via the di message), the client's preferred zoom level becomes the initial zoom level for the display array. If the client joins an existing display array, the preferred zoom level sent in its id message is ignored, and the zoom level associated with the existing display array is sent (in the av message).

Client ID Response:

```
// server - - > client
[−1, "id", client-id]
```

Clients are required to store the assigned client ID for use in subsequent socket requests.
Informs a new client of their ID. In this case, sender-id is set to −1
client-id
(string) the ID of the newly-joined client Join Room:

```
// server < - - client
[sender-id, "jr", room-id, [data]]
[sender-id, "jr", "lobby"]
[sender-id, "jr", "session", session-id]
[sender-id, "jr", "array", {arrayId: "myArrayId", x: 0, y: 0, width: 1920, height: 1080}]
```

Informs the server of an attempt by the client to join a room.
room-id
can contain one of lobby or session.
data
a wildcard set of arguments, which should be used to initialize the room.

Room Data Arguments:
Session requires session-id containing the id of the session
Array requires:
arrayId (string) id of the display array
x (integer) x offset of this display
y (integer) y offset of this display
width (integer) width of this display
height (integer) height of this display
Server will respond with a "room" message in response.

Room Join Response:

```
// server - - > client
[−1, "room", [room-id], [databag]]
[−1, "room", "lobby", {pin: pin-code}]
[−1, "room", "session", {sessionName: session-name}]]
``` room-id
contains one of: lobby or session
databag
a room-specific bag of variables:
lobby provides:
pin
containing the pin for wall authentication
session provides:
sessionName
containing the name of the session Room List Response

```
// server - - > client
[−1, "rl", roomMembershipList]
```

Informs the client of the room memberships. Room memberships include information regarding clients visiting the same room as you.
roomMembershipList
(array of room membership objects)

Session Request:

```
// server < - - client
[sender-id, "sr"]
```

Informs the server that the client would like the list of joinable active sessions.

Session List:

```
// server - - > client
[−1, "sl", sessionList]
```

Informs the client of the joinable active sessions.
sessionList (array of strings)

Set Card Position, Bounds and Z-index:

```
// server < - > client
[client-id, "or", card-id, x1, y1, x2, y2, z-order]
```

Set a new bounding rect and z-order for the card.
client-id (string) the ID of the client
card-id (string) the ID of the card
x1, y1 (int) the desired point of origin for the new card rect x2, y2 (int) the desired point of extent for the new card rect
z-order (int) the visual z-index sort order
Set Card Vector:

```
// server < - > client
[client-id, "cv", card-id, x, y]
```

Indicates to listening clients that a "fling" has occurred with the specified x and y.
A closing 'or' is suggested to be sent once the card has come to rest to help mask any latency issues between clients.
client-id (string) the ID of the client
card-id (string) the ID of the card
x, y (int) the impulse for each direction
Delete Card:

```
// server < - > client
[sender-id, "od", card-id]
```

Delete a card.
card-id (string) the ID of the card to delete
///
Object Create:

```
// server -> client
[sender-id, "oc", {
  id: eventID
  baseName: beginning of image path
  ext: extension
  rect: [x, y, x2, y2]
  actualWidth: width
  actualHeight: height
  order: z order of the image
}]
```

Append depth and extension to base path to build image url for this object.
Given these parameters from the server:
baseName: '/sessions/objects/sessionId/4ff633af45550592c60000c2' ext: 'jpg'
A path for zoom level 10 would look like:
'/sessions/objects/sessionId/4ff633af45550592c60000c2-10.jpg'
Begin Stroke:

```
// server < - - > client
[client-id, "sb", stroke-id, region-id, target-id, x, y, properties]
```

Begin a new stroke. x and y specify the starting point, properties is a JSON object containing properties related to the brush used for this stroke.
client-id (string) the ID of the originating client
region-id (string) the ID of the region the stroke started in. A null value means the stroke did not originate within a region.
target-id (string) the ID of the drawing target
x,y (int) the starting point of this stroke
properties (object) a JSON object with this structure:
{"brush":1, "size":2, "color":[214,0,17,1]}

Continue Stroke:

```
// server < - - > client
[sender-id, "sc", stroke-id, x,y]
```

Continue the stroke.
stroke-id (string) the ID of the continued stroke
x,y (int) the new end-point of the stroke
End Stroke:

```
// server < - - > client
[sender-id, "se", stroke-id]
```

End the stroke specified by stroke-id
stroke-id (string) the ID of the continued stroke
Stroke:

```
// server - - > client
[sender-id, "sx", stroke-id, locs, properties, create-time, target-id]
```

Notifies the clients of whole strokes.
stroke-id (string) the ID of stroke
locs (array) stroke locations in the format: [10, 1, 10, 2, 12, 3] where coordinates are paired [x, y, x, y, x, y] in an array
properties (object) the stroke properties (see: 'Begin Stroke')
create-time (date) the time the stroke was created, in milliseconds since 1 Jan. 1970 00:00:00 UTC
target-id (string) the ID of the stroke target
Delete Stroke:

```
// server - - > client
[sender-id, "sd", stroke-id, target-id]
```

Delete a stroke.
stroke-id (string) the ID of stroke
target-id (string) the ID of the stroke target
Undo:

```
// server < - - client
[sender-id, "un"]
```

Undo last stroke action.
Display Array Dimensions:

```
// server - - > client
[-1, "dd", arrayId, width, height]
```

Informs clients of changes to the overall display array width and height
arrayID (string) the ID of the display array
width, height (integers) width and height of the display array in pixels
Tool Change:

```
// server < - - client
[sender-id, "tc", toolMode, region-id, brushSettings]
```

Inform a display array of a tool change.
toolMode string the new tool mode
region-id canvas region id
brushSettings hash the new brush settings. For example: {size: 10, color: "#FFF", shadow: false}

```
// server --> client
[sender-id, "tc", toolMode]
```

Inform siblings in a display array what the tool was changed to.
toolMode (string) the new tool mode Cards Locked:

```
// server <--> client
[sender-id, "il", arrayId, cardsLocked]
```

Lock or unlock all cards. Locked cards are not to be moved or resized. Also used for keeping the pan-lock toolbar icon in sync.
arrayID (string) the ID of the display array
cardsLocked (boolean) True to lock all cards, false to unlock all cards.

Region Open:

```
// server <-- client
[sender-id, "ro", region-id, [min, max], [locationX, locationY]]
```

Informs the server a canvas region has been opened on this client. The server should reallow panning
[min, max] (array) the canvas region horizontal range in display space (integers)
[locationX, locationY] (array) the location of the event that opened the toolbar Region Move:

```
// server <-- client
[sender-id, "rr", region-id, [min, max]]
```

Informs the server a canvas region has been moved on this client.
[min, max] (array) the canvas region horizontal range in display space (integers)

Region Close:

```
// server <-- client
[sender-id, "rc", region-id]
```

Informs the server the region has been closed. The server should reallow panning of the array.

Pan Array:

```
// client --> server
[sender-id, "pa", newArrayOffsetX, newArrayOffsetY]
```

Inform the server of a pan to a new location.
newArrayOffsetX, newArrayOffsetY (int) the new location of the display array after panned.

Session Change:

```
// server --> client
[sender-id, "cs", sessionId]
```

Inform siblings in a display array that the session has changed.
sessionId (string) is the id of the session to switch to Zoom Change:

```
// client --> server
[sender-id, "zc", zoomLevel, zoomCenterX, zoomCenterY]
```

Inform the server that a zoom was requested.
zoomLevel (integer) the zoom level to transition to, from 1 to 11
zoomCenterX (integer) the x coordinate of the origin of the zoom
zoomCenterY (integer) the y coordinate of the origin of the zoom Map-Mode Change:

```
// client --> server
[sender-id, "mm", zoomLevel, zoomCenterX, zoomCenterY]
```

Inform the server that map-mode was requested. Superficially, this operates near identically to the zoom-change message, except where dozens or hundreds of zoom-change messages are meant to be sent rapid-fire with tweening between them in the graphical treatment, the map-mode message is intended for a single zoom snap with different transition effects.
zoomLevel (integer) the zoom level to transition to, from 1 to 11
zoomCenterX (integer) the x coordinate of the origin of the zoom
zoomCenterY (integer) the y coordinate of the origin of the zoom Create Card:

```
// server <-- client
[sender-id, "cc", templateId, regionId, x, y, x2, y2]
``` templateId (string) the id of the card template to be used
regionId (string) the canvas region id of the originating event (if any)
x, y, x2, y2 (int) the desired rect for the new card Global Mode Toggle:

```
Global Mode Open
// server <--> client
[sender-id, "go"]
Global Mode Close
// server <--> client
[sender-id, "gc"]
Toolbar position:
'''Javascript
// client <--> server
[-1 , "tp", regionId, x, y]
``` regionId (string) id of the region the toolbar belongs to
x (integer) x position of the toolbar origin in display array space
y (integer) y position of the toolbar origin in display array space Save Position:

```
// client --> server
[-1, "sp", zoomLevel, x, y]
```

Saves the current screen position. On reconnect, the client will receive a 'zc' (zoom-change) and 'pa' (pan-array) message sending them back to this location.

zoomLevel (integer) the zoom level the device is currently on
x (integer) the x coordinate of the origin of the screen
y (integer) the y coordinate of the origin of the screen Stroke IDs Stroke ID's are selected by the client. Currently they are the sender-id composed with an increasing integer, separated by a dot. This is to make it unique within the server context among all clients.

Target IDs

A stroke may be attached to a specific target in the session, like a sub-canvas (called a "card") that floats above the main canvas. In the case of a stroke belonging to a card, the target ID field would contain the card ID. Strokes destined for the main canvas in the session are designated by having their target ID be the same as the session name.

Establishing Connections

When a client establishes a new websocket connection with the server, the server first chooses a unique client ID and sends it in an "id" message to the client. It then sends the "pa" message with sender-id set to −1.

The typical flow then is for the client to perform an HTTP GET "/:sessionId/objects" (documented below) to receive information about the cards in the session. Then the client requests "/:sessionId/history" (also documented below), which receives an array of history urls. These are broken into batches to improve cachablity. The client then GETs each url not stored in the local cache, and the server will respond with the stroke data for those history batches.

Service Requests can be managed by the portal 602 executing for example an HTTP/REAL interface, in parallel with the Websocket links discussed above. Example Service Requests included:

History:

Gets a list of history bookmarks. Each bookmark is a span of cached stroke history.
curl http://localhost:4545/<sessionId>/history
sessionId name of the session you're getting the history for
Response Headers
HTTP/1.1 200 OK
X-Powered-By: Express
Access-Control-Allow-Origin: *
Access-Control-Allow-Headers: X-Requested-With
Content-Type: application/json; charset=utf-8
Content-Length: 42
Date: Fri, 14 Sep. 2012 17:35:14 GMT
Connection: keep-alive

```
Response
["/<sessionId>/history/<startTime>/<endTime>?b=1"]
["/<sessionId>/history/<startTime>/<endTime>?b=1"]
...
``` sessionId (string) id of the session to switch to
startTime (integer) beginning timestamp
endTime (integer) ending timestamp
b cache buster Retrieving a Block of History:

Gets the history between start time and end time. A request needs to be made for each returned span of history.
curl http://localhost:4545/<sessionId>/history/<startTime>/<endTime>?b=<cache-buster>
sessionId id of the session you're getting the history for
startTime the start time as given by initial history request
endTime the end time as given my initial history request
cacheBuster a simple key that will be changed whenever client-stored cache is no longer valid
Response Header
HTTP/1.1 200 OK
X-Powered-By: Express
Access-Control-Allow-Origin: *
Access-Control-Allow-Headers: X-Requested-With
Content-Type: application/json
Content-Length: 2134
ETag: 1346968307576
Date: Fri, 14 Sep. 2012 17:35:14 GMT
Connection: keep-alive

```
Response
[
  [
    4,
    "sx",
    "4.4",
    [537, 650, 536, 649, 536, 648, ...],
    {
      "size": 10,
      "color": [0, 0, 0, 1],
      "brush": 1
    },
    1347644106241,
    "cardFling"
  ]
]
```

(see documentation for sx "stroke-complete" websocket message)

Retrieving Objects:

Gets the objects (cards/images) for the requested session.
curl http://localhost:4545/<sessionId>/objects
sessionId id of the session you're getting the history for
Response Header
HTTP/1.1 200 OK
X-Powered-By: Express
Access-Control-Allow-Origin: *
Access-Control-Allow-Headers: X-Requested-With
Content-Type: application/json; charset=utf-8
Content-Length: 285
Date: Fri, 14 Sep. 2012 17:35:14 GMT
Connection: keep-alive

```
Response
[
  {
    "eventType": "oc",
    "id": "50536840ce64b39439000005",
    "baseName": "sessions/all/green",
    "ext": "JPEG",
    "rect": [−239, 49, 361, 649],
```

```
    "arrayId": 3,
    "clientId": 3,
    "regionId": null,
    "sessionId": "cardFling",
    "actualWidth": 600,
    "actualHeight": 600,
    "order": null,
    "_id": "50536840ce64b39439000005",
    "type": "image"
  },
  {
    "eventType": "oc",
    "id": "50536b66ce64b39439000006",
    "baseName": "sessions/all/orange",
    "ext": "JPEG",
    "rect": [-97, 190, 503, 790],
    "arrayId": 5,
    "clientId": 5,
    "regionId": null,
    "sessionId": "cardFling",
    "actualWidth": 600,
    "actualHeight": 600,
    "order": null,
    "_id": "50536b66ce64b39439000006",
    "type": "image"
  }
]
```

Card Templates:
Gets a list of global card templates for creating cached, re-usable cards. This is different from uploading a file as the same background-image is used for all cards created with this template.
curl http://localhost:4545/card_templates.json

```
Response
[
  {
    "id":"50901cb0b9a18c190902a938",
    "width":600,
    "thumbnail":"card_templates/thumbnails/pink.jpeg"
  },
  {
    "id":"50901cb0b9a18c190902a939",
    "width":600,
    "thumbnail":"card_templates/thumbnails/green.jpeg"
  }
]
```

These values can be used to send a create card message:

```
// creates a new card using the pink template above
["cc", "50901cb0b9a18c190902a938", <regionIdOrNull>, <x>, <y>]
```

Figure 8:
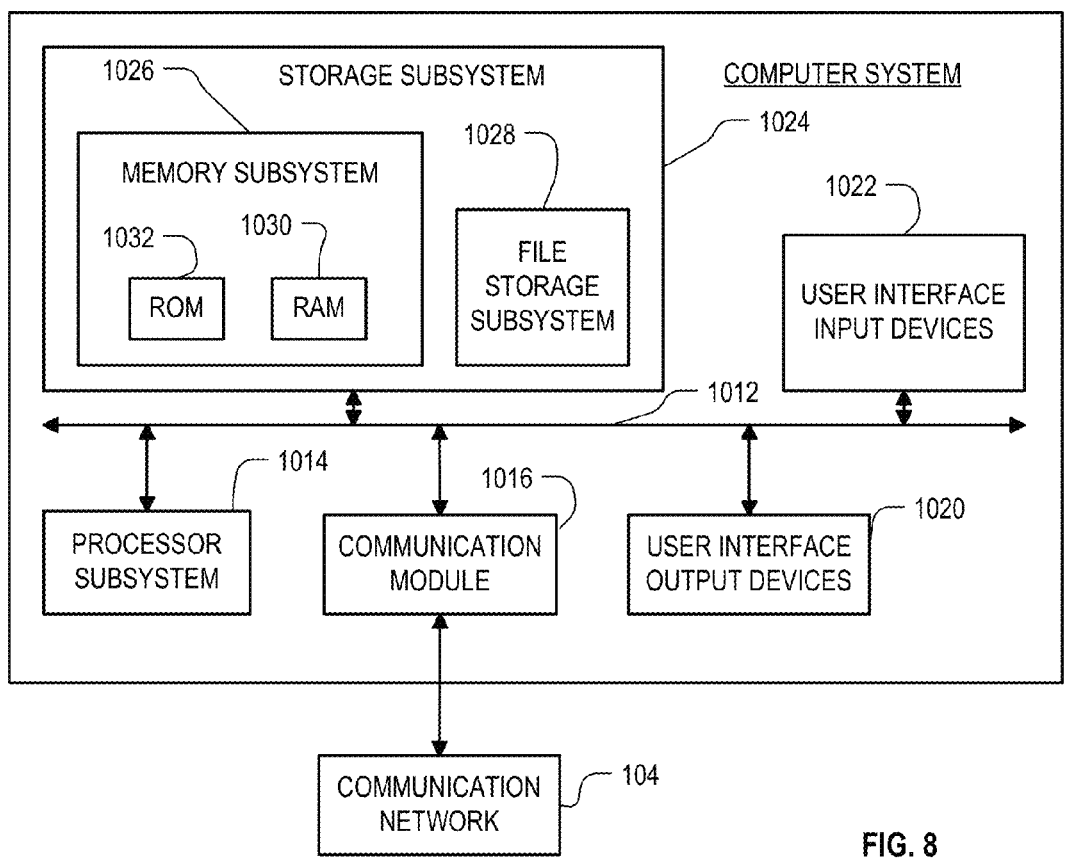
FIG. 8 is a simplified block diagram of the computer system 110, e.g. a client device computer system (FIG. 1B).

Upload:
Sends an image to the server to be placed in the session.
curl -F "file=@photo.JPG" -F "x=236" -F "y=832" -F "clientId=10" -F "sessionId=cardFling"
-F "arrayId=10" -F "order=23" -F "x2=899" -F "y2=1495" -F "filename=photo.jpg"
http://localhost:4545/<sessionId>/object/upload
Params
x: x position of drop
y: y position of drop
clientId: client Id
sessionId: session Id
arrayId: array identifier
order: z order
x2: x position of bottom right corner of drop
y2: y position of bottom right corner of drop
filename: name of file uploaded FIG. 8 is a simplified block diagram of a computer system which can be used to implement the client side functions (e.g. computer system 110) or the server-side functions (e.g. server 105) in a distributed collaboration system. A computer system typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with the computer system. Communication module 1016 provides physical and communication protocol support for interfaces to outside networks, including an interface to communication network 104, and is coupled via communication network 104 to corresponding communication modules in other computer systems. Communication network 104 may comprise many interconnected computer systems and communication links. These communication links may be wireline links, optical links, wireless links, or any other mechanisms for communication of information, but typically it is an IP-based communication network, at least at its extremities. While in one embodiment, communication network 104 is the Internet, in other embodiments, communication network 104 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display (including the touch sensitive portions of large format digital whiteboard 102c), audio input devices such as voice recognition systems, microphones, and other types of input devices. In general, use of the term "input device" is intended to include all possible types of devices and ways to input information into the computer system or onto computer network 104.

User interface output devices 1020 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital whiteboard 102c. The display subsystem may also provide non visual display such as via audio output devices. In general, use of the term "output device" is intended to include all possible types of devices and ways to output information from the computer system to the user or to another machine or computer system.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor subsystem 1014.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer", execute on the processor subsystem 1014 in response to computer instructions and data in the host memory subsystem 1026 including any other local or remote storage for such instructions and data.

Bus subsystem 1012 provides a mechanism for letting the various components and subsystems of computer system communicate with each other as intended. Although bus subsystem 1012 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, computer system includes several computer systems, each controlling one of the tiles that make up the large format whiteboard 102c. Due to the ever changing nature of computers and networks, the description of computer system 110 depicted in FIG. 8 is intended only as a specific example for purposes of illustrating the preferred embodiments of the present invention. Many other configurations of the computer system are possible having more or less components than the computer system depicted in FIG. 8. The same components and variations can also make up each of the other devices 102 in the collaboration environment of FIG. 1, as well as the collaboration server 105 and whiteboard database 106. Another embodiment of a computer system that can be used to implement collaboration server 105 is set forth in the above-incorporated PCT International Application No. PCT/US12/39176.

Figure 9:
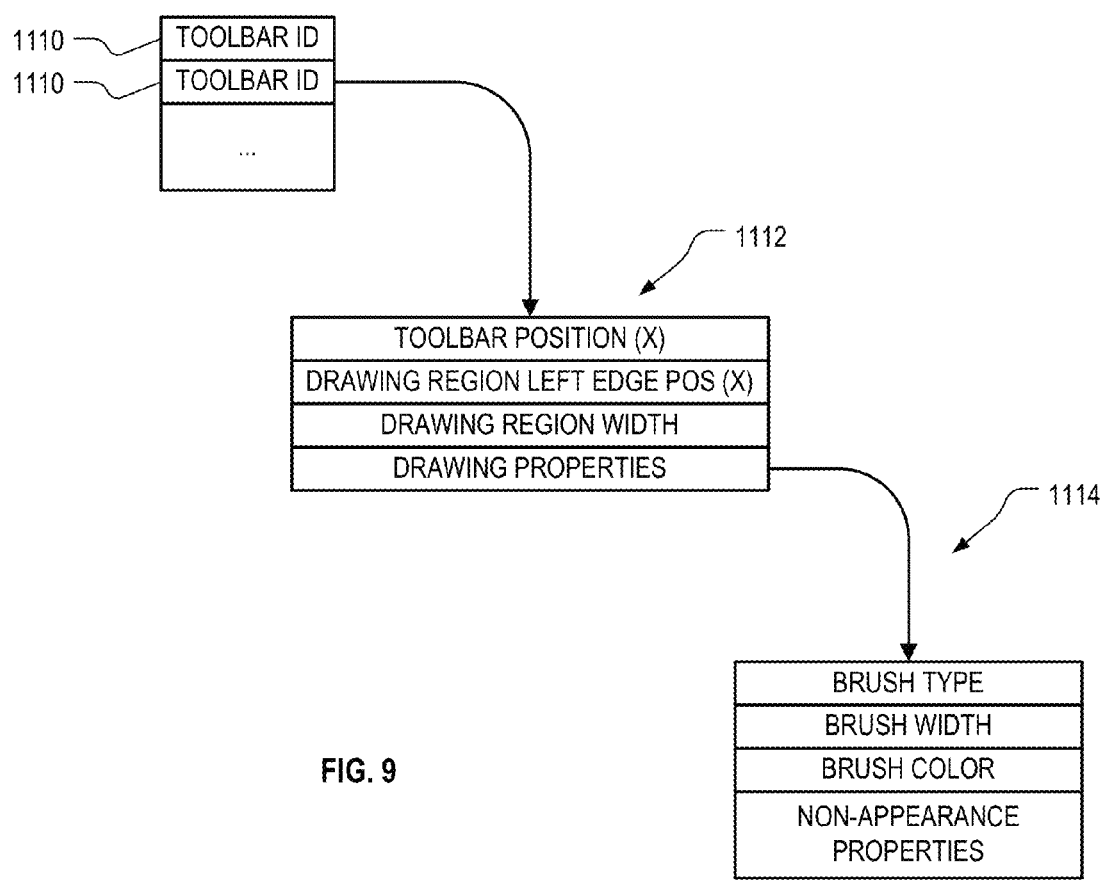
FIG. 9 is a schematic drawing of a database stored accessibly to the client device computer system 110 (FIG. 1B).

Certain information about the drawing regions active on the digital whiteboard 102c are stored in a database accessible to the computer system 110 of the display client. The database can take on many forms in different embodiments, including but not limited to a MongoDB database, an XML database, a relational database, or an object oriented database. FIG. 9 is a schematic diagram illustrating certain information that the database contains, and certain relationships among the data.

In embodiments described herein, each drawing region is considered to be a child of a toolbar. The touching of a point on the wall background spawns a toolbar, which in turn spawns a drawing region (though the toolbar is not necessarily visible until the drawing region opens). Similarly, to close a drawing region, a user touches a 'close' icon on the drawing region's toolbar. Thus in FIG. 9, the database is headed by one or more toolbar ID's 1110. Each toolbar ID 1110 includes or points to a respective block 1112 of data, indicating the horizontal position of the toolbar, the horizontal position of the left edge of the toolbar's drawing region, with width of the drawing region, and a set of drawing properties for the drawing region. It will be appreciated that many variations are possible, such as specifying the right edge position of the drawing region rather than the left, and specifying the opposite edge position rather than the drawing region width. The toolbar position has only a horizontal value, because in an embodiment, it always remains at the same vertical position. In another embodiment both horizontal and vertical positions may be specified.

Figures 10, 11:
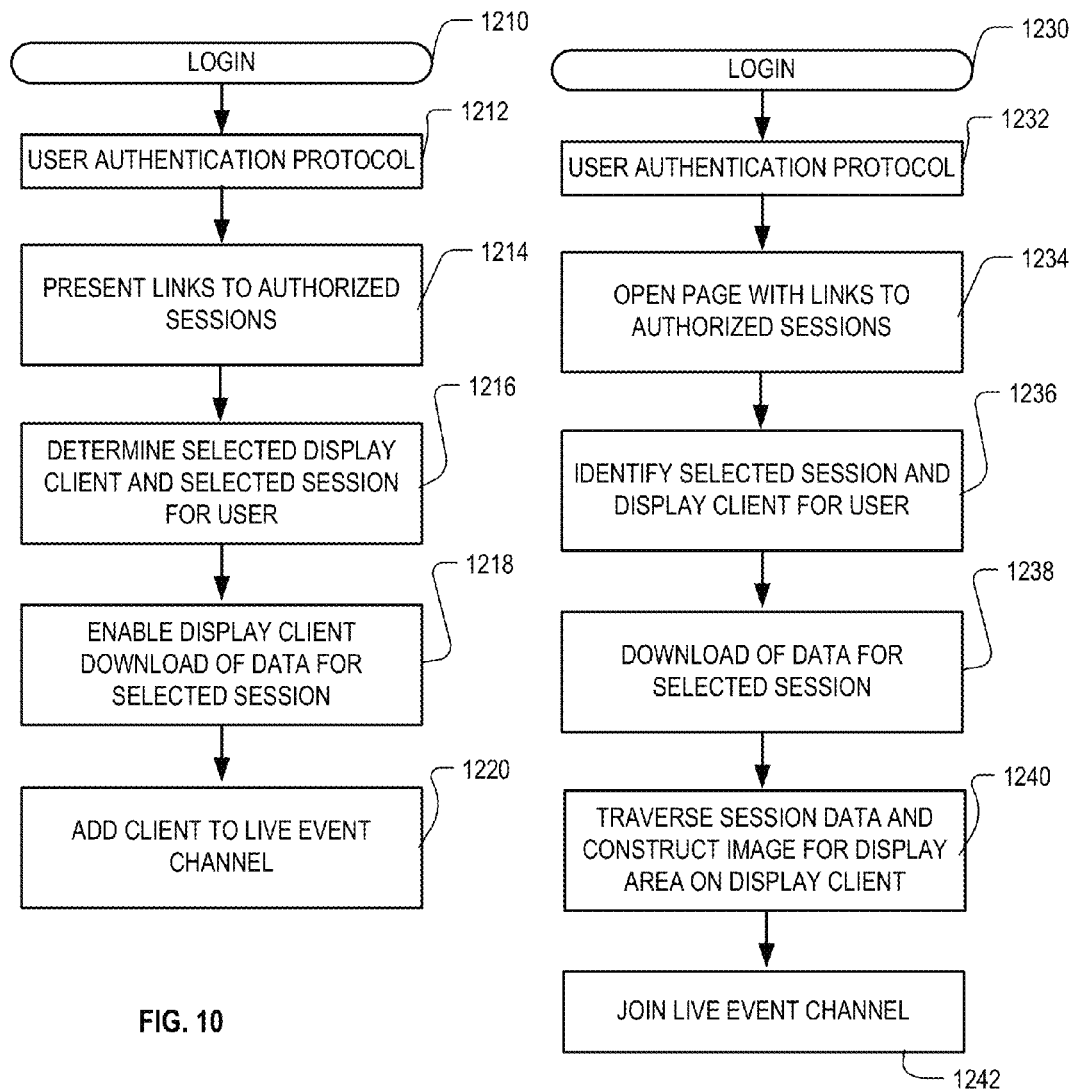
FIG. 10 is a flowchart illustrating aspects of server-side logic of a user login sequence that can be used for a collaboration system.
FIG. 11 is a flowchart illustrating aspects of client side logic of a user login sequence that can be used for a collaboration system.

The drawing properties include or point to an array 1114 of drawing attributes, each in association with one or more values. The drawing properties in FIG. 9 include a brush type, the value of which may for example indicate "paint", "ink", "crayon", "marker" or "eraser", each of which has a different character of appearance when drawn on the whiteboard 102c. The drawing properties in FIG. 9 also include a brush width, which can take on any value in a range of available values. The drawing properties in FIG. 9 also include a brush color, which has three associated values: red, green and blue content. As used herein, the three attributes brush type, brush width and brush color are considered to constitute "line appearance properties." Drawing properties 1114 may in various embodiments also include other attributes, such as those that affect its location of the line or the location of part of the line. These properties may include such attributes as corner-rounding radius, or Bezier curve parameters. As can be seen in FIG. 11, there is no requirement that the drawing properties (including the line appearance properties) for different drawing regions be the same. They can be established independently of each other, so there is no need that they be identical. In a typical case they will not be identical.

In order to draw a line on the whiteboard 102c, a user provides "drawing user input" which indicates the drawing of the line. While other embodiments may allow a user to draw with a finger, in the embodiment of FIG. 1, only a stylus can be used to indicate the drawing of a line. Intuitively, the user so indicates by touching the stylus to the whiteboard 102c surface, within a drawing region, and dragging the stylus along the positions desired for the line. The end of a line drawing operation is indicated by lifting the stylus from the whiteboard 102c surface. The local computer system 110 determines from the user input where the points on the line are to be positioned, and displays them on the whiteboard 102c. The computer system 110 also transmits the stroke information to the collaboration server 105 (FIG. 1B), which writes them into its whiteboard database 106 and transmits them back to the various devices 102 sharing the session. Each of the devices 102 can then display the line (so long as the line intersects the device's viewport), so all such devices 102 will show the line at roughly the same time.

FIGS. 10-14 are flowcharts illustrating logic executed by the server, the display clients or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

FIG. 10 illustrates basic logic executed on the server side when a user joins a session as part of a persistent collaboration. The flowchart begins with a login by the user (1210), in which the user may enter a user identifier in a web portal access through a device possessed by the user, such as a personal computer, a touchpad, a smart phone, etc. Next, a user authentication protocol is executed (1212), where a protocol for example can include requiring the user to enter a personal password, to verify that the user is in fact a person who has entered the user identifier. Next, the collaboration server, using for example the portal machine, can present links to collaborations in which the authenticated user is authorized to participate (1214). Next, the collaboration server can determine a selected display client, and a selected collaboration for the user (1216). This determination can be made by an exchange of messages between the user possessed machine, and the portal using the communication n channel on which the authentication protocol is executed. When the display client and collaboration are identified, the collaboration server can enable the display client to download data for the selected collaboration (1218). Also, the collaboration server can add to the client to a live event channel for the selected collaboration (1220).

FIG. 11 illustrates basic two-channel logic executed on the client side when a user joins a collaboration. The flowchart begins with a login by the user (1230) executed on a first channel, in which the user may enter a user identifier and transmit it to the web portal. Next, the user authentication protocol is executed (1232). The user then opens a page at the portal using the communication channel on which the authentication protocol is executed, which displays links for authorized collaborations (1234). Next, the user enters data identifying a selected collaboration and display client to be used in the current session (1236) using the first channel. After the server enables the selected display client, the user activity can transfer to a channel between the display client and the server, which can then download the collaboration data for the selected session (1238). The display client can then traverse the collaboration data and construct an image for the display area managed by the display client (1240). Also, the display client can then join the live event channel (1242).

In one example, the process of downloading the collaboration data includes delivering the event objects for the session to each display client. Included with the collaboration data, a current user location can be provided. Alternatively, the collaboration data can be delivered, followed by a sequence of messages which identify to the display client how to compute an offset from a default location, such as at the center of the collaboration data, to a current location associated with the user. Each display client then can traverse the event objects to identify those objects having session locations which map to the display area managed by the display client. The logic to traverse the event objects can include an R-TREE search for example, which is configured to find objects in the collaboration space that map to the display area. The identified objects can then be rendered, possibly communicating with the portal to obtain data relevant to the objects, on the display area managed by the display.

Figure 12:
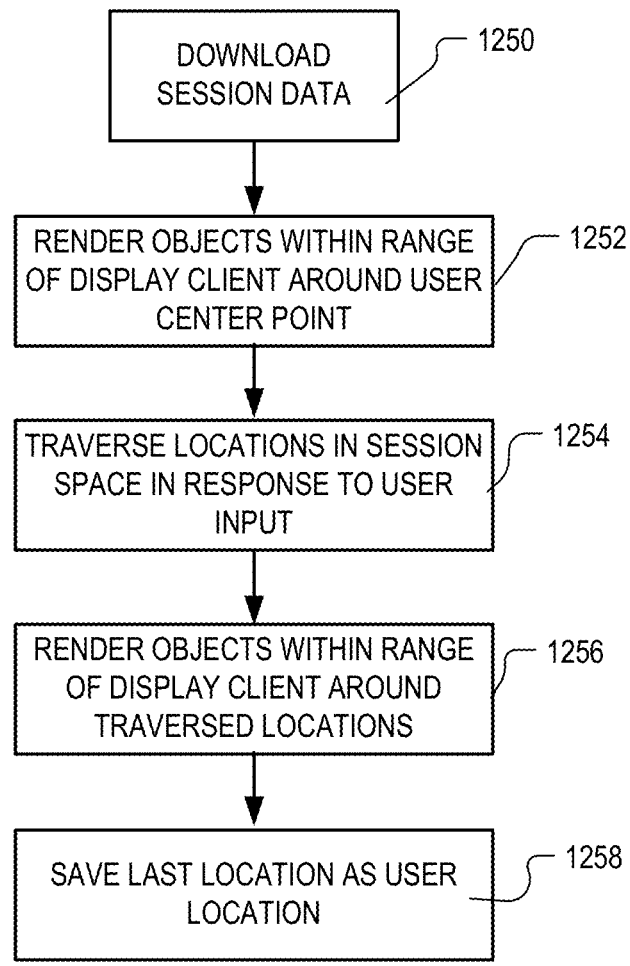
FIG. 12 is a flowchart illustrating aspects of client side logic for a display client in a wall being used for a collaboration session.

FIG. 12 illustrates basic logic on the client side related to downloading collaboration data. Logic begins with a download of collaboration data from the collaboration server (1250). The display client renders the objects that are within the range of the display client around the user focus (1252), where the user focus is determined from the location within collaboration space provided by the server. The display client holds the collaboration data, or at least portions of the collaboration data including objects having current locations in collaboration data, that are close to the user focus. During the session, in response to user input or other data, the display client traverses locations in the collaboration space to determine the current location in collaboration space (1254). The display client then renders objects within the range around the traversed locations (1256). At the end of the session, the last location within the collaboration space mapped by the display client is saved as the user location on a collaboration server (1258).

Figure 13:
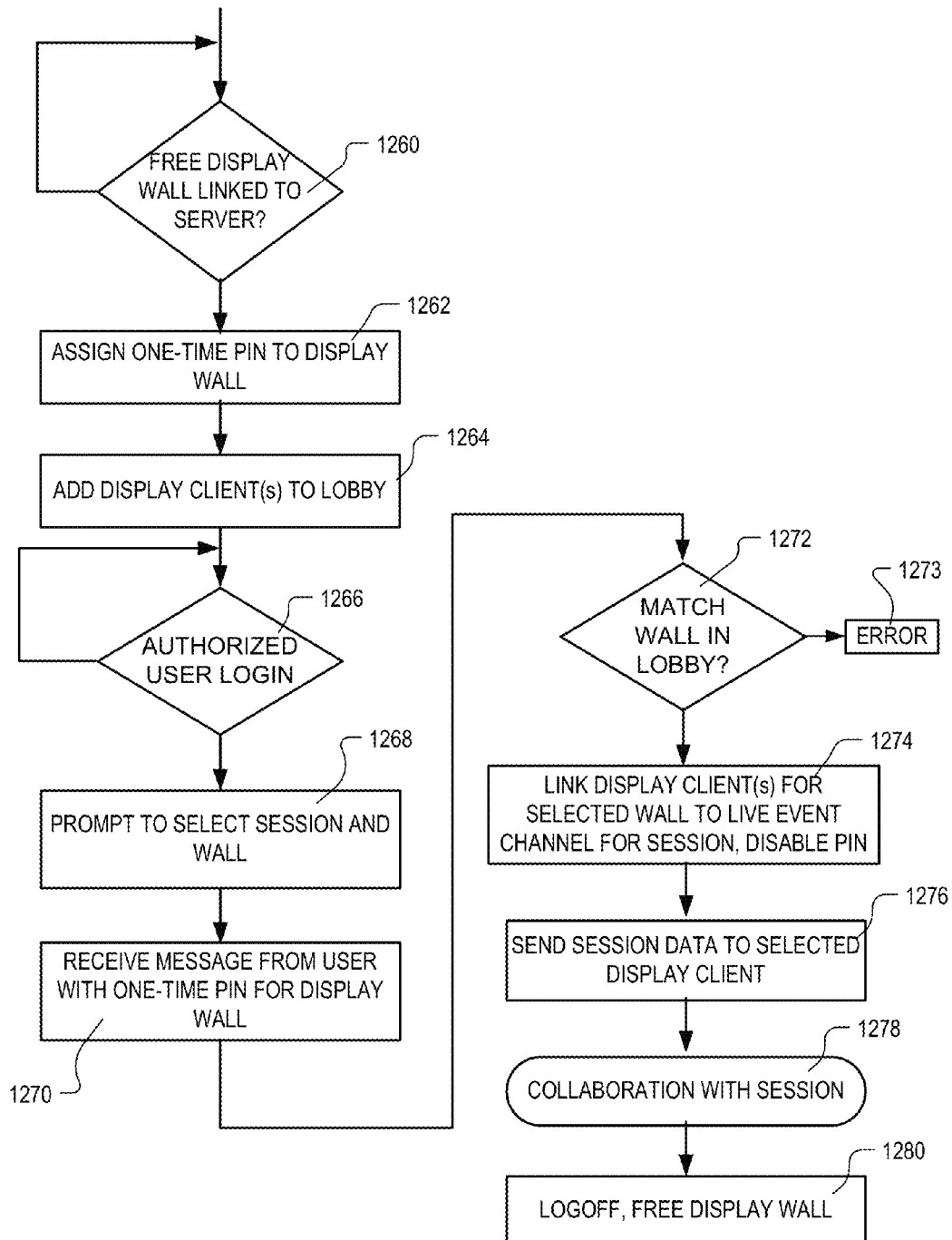
FIG. 13 is a flowchart illustrating aspects of server-side logic managing utilization of distributed display walls in a collaboration system.

FIG. 13 illustrates logic executed by the server-side for managing access to whiteboards to which access is shared among many users. In this example, the server maintains a list of free display walls the active links to the server. These links can be set up when the display walls are turned on, and maintained during waiting periods in which the display wall is idle. The server can include logic to determine whether a free display wall has a link to the server (1260). If a wall is detected that has a link to the server, then it is assigned a one-time identification code or PIN. When the identification code is assigned, then the wall is added to a "lobby", which comprises a list of available walls (i.e. free walls) in the collaboration system (1264). The server also executes a loop waiting for authorized user logins (1266). When a login is detected, the server prompts the user to select a collaboration and to select a wall, for which the user is authorized (1268). The server then requires the user to enter the one-time identification code associated with the selected wall (1270). If the server does not receive a matching identification code for the selected wall (1272), then an error signal is issued (1273). When the server receives a matching identification code for the selected wall (1272), then the display client or clients associated with the selected wall are linked to a live event channel for the session, and the one-time identification code is disabled or changed, while the wall is occupied. (1274). Also, the server sends the collaboration data to the selected display client or clients (1276). The user is then able to collaborate with the session after receiving the collaboration data (1278). When the user logs off of the session, then the display wall is freed (1280). If the display wall remains available, it can be indicated to be a free display wall to the server, and added to the lobby with a new identification code, following sequence of steps 1260, 1262, 1264. In some embodiments, the identification code is changed upon expiration of a time out interval, providing security against logins by intruders who might steal the identification code from a wall that is not in use.

Figure 14:
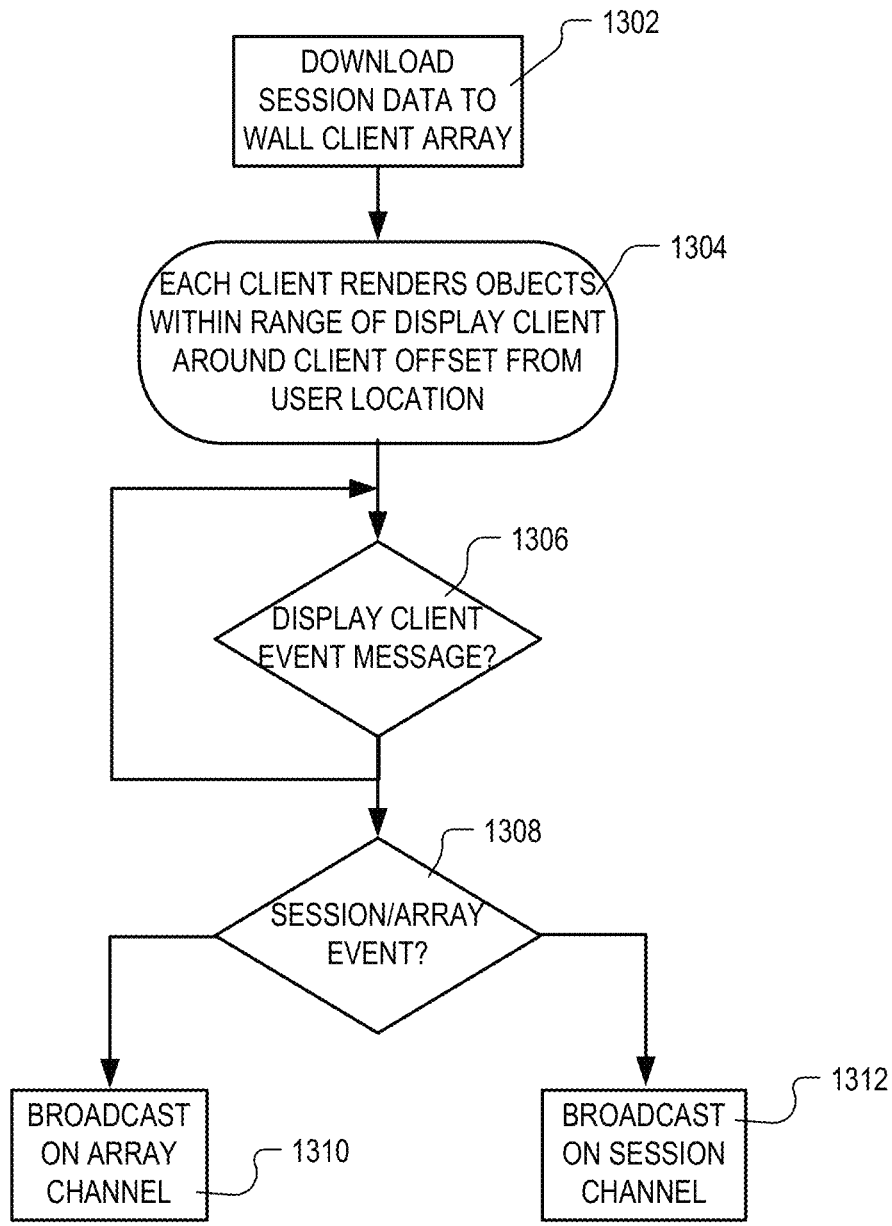
FIG. 14 is a flowchart illustrating aspects of client-side logic for a federated display system being utilized as a whiteboard in a collaboration system.

FIG. 14 illustrates basic logic executed on the server-side to manage a federated display array. The first step in this flowchart involves downloading the collaboration data to each of the display clients in the array (1302). Each display client renders objects within the range of the display client around a client offset from the user location (1304). The server monitors for client event messages (1306). When the server receives a client event message from one of the display clients in the array, it determines whether the message relates to the collaboration data or only the array (1308). Array messages are broadcast on an array channel so that only those display clients participating in the federated display array receive the messages (1310). Collaboration data messages are broadcast on the collaboration channel, so that all of the display clients participating in sessions with collaboration data are updated as appropriate (1312). Those messages that relate only to the federated display array, can include such messages as those that update the location of toolbars and drawing regions as described above. Also, messages that do not change the location of objects in the collaboration space, and do not create or modify objects that are part of the collaboration data, can be determined to be local array only messages.

Figure 15:
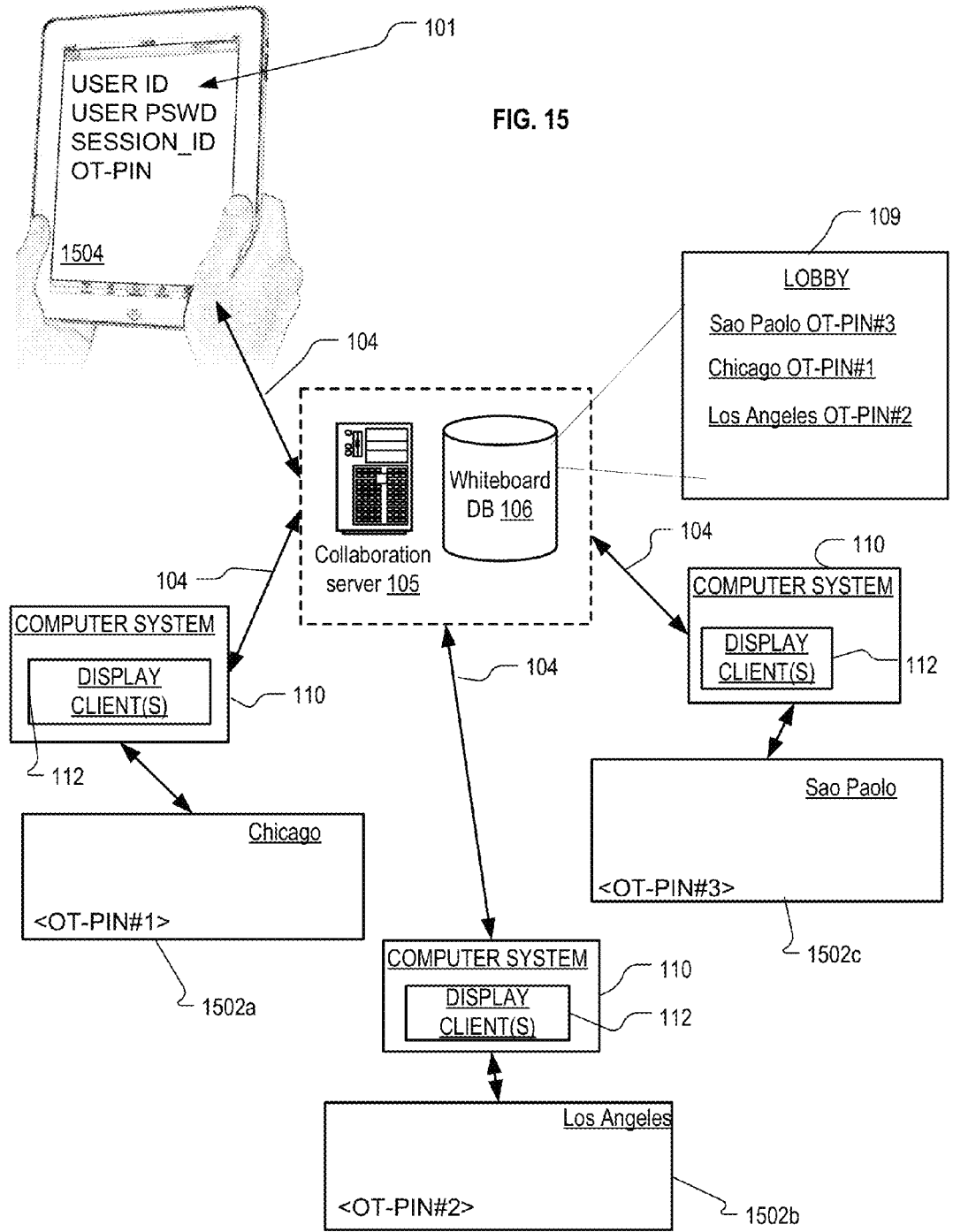
FIG. 15 illustrates, in the style of FIG. 1B, a system supporting distributed whiteboard collaboration where there are displays distributed widely.

FIG. 15 illustrates, in the style of FIG. 1B, a system supporting distributed whiteboard collaboration where there are displays distributed widely. The system includes a collaboration server 105, with an associated whiteboard database 106 storing collaboration data. The collaboration server is connected by communication links 104 to a plurality of walls 1502a, 1502b, 1502c which might be located for example in Chicago, Los Angeles and Sao Paulo. The collaboration server 105 is also coupled to a user device 1504, such as a touchpad or other personal computing platform, which can be expected to be in the possession of a known user. As mentioned above in connection with FIG. 13, the collaboration server 105 can maintain a list of free display walls in a data structure referred to as a "lobby" 109. Associated with each of the display walls is a one-time identification code, including OT-PIN#1 associated with the display wall in Chicago, OT-PIN#2 associated with the display wall in Los Angeles, and OT-PIN#3 associated with the display wall in Sao Paulo. A user in possession of the personal device 1504 can login to the portal managed by the collaboration server 105, entering a user ID and a user password for the purposes of user authentication. Then, the user in possession of the personal device 1504 can provide a collaboration identifier and an identification code for a display wall to which the user wants collaboration data to be displayed. When the collaboration server successfully authenticates the user, and determines that the user has identified a display wall for which the user is authorized, and a collaboration for which the user is authorized, the display client associated with the identified display can be linked to the collaboration event channel and enabled to download collaboration data. When the display device is enabled for a given session, it is removed from the lobby 109, and the one time identification code is deleted or changed. Each time the display is added to the lobby 109, a new one time identification code can be computed.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, though the whiteboards described herein are of large format, small format whiteboards can also be arranged to use multiple drawing regions, though multiple drawing regions are more useful for whiteboards that are at least as large as 12' in width. In particular, and without limitation, any and all variations described, suggested by the Background section of this patent application or by the material incorporated by references are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A system supporting distributed whiteboard collaboration, comprising:
   a computer system having
      a communication module,
      a processor, and
      a database accessible thereto,
         the database storing collaboration data for at least one collaboration having a collaboration space,
            the collaboration data including
               data structures identifying objects displayable by a display client on a display wall and associating locations in the collaboration space with the objects, and
   the system including a processor with:
      logic configured to
         identify a free display wall, linked to the computer system, and
         send a one-time identification code to a display client of the identified free display wall,
            wherein the one-time identification code is usable by the display client to display the one-time identification code;

logic to detect
user input via the communication module identifying
a collaboration and
an identification code; and
logic to determine that
the identified identification code matches the one-time identification code sent to the display client and
in response to the determination
disabling or changing the one-time identification code of the identified display wall and delivering the collaboration data for the identified collaboration to the display client.

2. The system of claim 1, including logic to identify a user requesting access to the collaboration prior to enabling delivery of collaboration data to the display client.

3. The system of claim 1, wherein the collaboration data comprises an event history for the identified collaboration,
usable by the display client to render images on the display wall, and
said logic to enable delivery of collaboration data authorizes delivery of some or all of the event history to the display client, and
links the display client to an event channel for delivery of live events, and
including logic to associate the identified user with the event channel.

4. The system of claim 1,
wherein the user input identifying a collaboration and an identification code is received at the communication module on a channel between the computer system and a device other than said display client.

5. The system of claim 1,
wherein the display wall has a display area for displaying objects,
the display area being mapped to corresponding area in the collaboration space, and
including logic to identify a user location in the collaboration space to the display client,
the user location being usable by the display client to identify objects in the collaboration data within the display area.

6. The system of claim 1, including logic to change the one-time identification code of the display wall upon expiration of a time out interval.

7. A method supporting distributed whiteboard collaboration, comprising:
storing collaboration data for at least one collaboration having a collaboration space,
the collaboration data being
accessible by a collaboration server and
including data structures identifying objects displayable by a display client on a display wall and
associating locations in the collaboration space with the objects;
identifying an available display wall linked to a collaboration server and
sending a one-time identification code to a display client of the identified available display wall,
wherein the one-time identification code is usable by the display client to display the one-time identification code;
detecting user input via the communication module identifying a collaboration and an identification code; and
determining
that the identified identification code matches the one-time identification code sent to the display client and
in response to the determination, disabling or changing the one-time identification code of the identified display wall and delivering the collaboration data for the identified collaboration to the display client.

8. The method of claim 7, including identifying a user requesting access to the collaboration prior to enabling delivery of collaboration data to the display client.

9. The method of claim 7, wherein the collaboration data comprises an event history for the identified collaboration, usable by the display client to render images on the display wall, and said enabling delivery of collaboration data authorizes delivery of some or all of the event history to the display client, links the display client to an event channel for delivery of live events, and associates the identified user with the event channel.

10. The method of claim 7, including receiving the user input identifying a collaboration and an identification code on a channel between the collaboration server and a device other than said display client.

11. The method of claim 7, wherein the display wall has a display area for displaying objects, the display area being mapped to corresponding area in the collaboration space, and including identifying a user location in the collaboration space to the display client, the user location being usable by the display client to identify objects in the collaboration data within the display area.

12. The method of claim 7, including changing the one-time identification code of the display wall upon expiration of a time out interval.

13. An article of manufacture comprising a non-transitory computer readable data storage medium storing a computer program or programs executable by a computer system, the computer program or programs including:
logic to access a database, the database storing collaboration data for at least one collaboration having a collaboration space, the collaboration data including data structures identifying objects displayable by a display client on a display wall and associating locations in the collaboration space with the objects;
logic configured to
identify a free display wall, linked to the computer system, and
send a one-time identification code to a display client of the identified free display wall,
wherein the one-time identification code is usable by the display client to display the one-time identification code;
logic to detect
user input from the display client identifying a collaboration and an identification code; and
logic to determine that
the identified identification code matches the one-time identification code sent to the display client and
in response to the determination,
disabling or changing the one-time identification code of the identified display wall and delivering the collaboration data for the identified collaboration to the display client.

* * * * *